United States Patent
Park et al.

(10) Patent No.: US 12,189,282 B2
(45) Date of Patent: Jan. 7, 2025

(54) LENS DRIVING APPARATUS CAPABLE OF FACILITATING AN OPERATION OF BONDING A COIL TO AN ELASTIC MEMBER, AND CAMERA MODULE AND OPTICAL DEVICE COMPRISING SAME

(71) Applicant: LG INNOTEK CO., LTD., Seoul (KR)

(72) Inventors: Sang Ok Park, Seoul (KR); Kyung Hwan Kim, Seoul (KR); Tae Bong Park, Seoul (KR); Jung Cheol Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 574 days.

(21) Appl. No.: 17/606,678

(22) PCT Filed: May 11, 2020

(86) PCT No.: PCT/KR2020/006153
§ 371 (c)(1),
(2) Date: Oct. 26, 2021

(87) PCT Pub. No.: WO2020/226465
PCT Pub. Date: Nov. 12, 2020

(65) Prior Publication Data
US 2022/0206364 A1    Jun. 30, 2022

(30) Foreign Application Priority Data

May 9, 2019   (KR) .................. 10-2019-0054306
Sep. 26, 2019  (KR) .................. 10-2019-0119200

(51) Int. Cl.
*G02B 27/64*    (2006.01)
*G03B 5/00*     (2021.01)
(Continued)

(52) U.S. Cl.
CPC .............. *G03B 5/00* (2013.01); *G03B 17/12* (2013.01); *H04N 23/54* (2023.01); *H04N 23/55* (2023.01); *G03B 2205/0069* (2013.01)

(58) Field of Classification Search
CPC ........ G02B 27/64; G02B 27/646; G03B 5/00; G03B 17/12; G03B 2205/0069;
(Continued)

(56) References Cited

U.S. PATENT DOCUMENTS

2019/0033554 A1   1/2019  Shin
2020/0035408 A1   1/2020  Lee et al.

FOREIGN PATENT DOCUMENTS

CN    105988177 A   10/2016
CN    108781033 A   11/2018
(Continued)

*Primary Examiner* — Arnel C Lavarias
(74) *Attorney, Agent, or Firm* — Birch, Stewart, Kolasch & Birch, LLP

(57) ABSTRACT

A lens moving apparatus includes a housing; a bobbin disposed in the housing; a coil coupled to the bobbin; a magnet which is disposed in the housing and faces the coil; a base disposed to be spaced apart from the bobbin; a lower elastic member including a first elastic member, a second elastic member, a third elastic member, and a fourth elastic member, which are coupled to the bobbin and disposed on the base; and a sensing coil which is disposed in the housing and generates an induced voltage by an interaction with the coil. A corner of the base and a corner of the housing form a coupling area where the corners are coupled to each other, and the sensing coil includes a portion disposed outside the coupling area.

20 Claims, 27 Drawing Sheets

(51) Int. Cl.
*G03B 17/12* (2021.01)
*H04N 23/54* (2023.01)
*H04N 23/55* (2023.01)

(58) Field of Classification Search
CPC ... G03B 2217/005; G03B 2205/00; G03B 5/06; G03B 13/36; H04N 23/54; H04N 23/55; H04N 5/23248; H04N 5/23264; H04N 5/2328; H04N 5/23287
USPC ....... 359/557, 554; 250/201.1, 201.2, 201.4; 348/208.99, 208.2, 208.12; 396/52, 55
See application file for complete search history.

(56) References Cited

FOREIGN PATENT DOCUMENTS

| | | | | |
|---|---|---|---|---|
| KR | 10-2015-0072877 A | 6/2015 | | |
| KR | 10-2016-0001577 A | 1/2016 | | |
| KR | 10-2016-0037732 A | 4/2016 | | |
| KR | 10-2016-0126587 A | 11/2016 | | |
| KR | 10-2017-0092810 A | 8/2017 | | |
| KR | 10-2018-0014527 A | 2/2018 | | |
| KR | 10-2018-0037690 A | 4/2018 | | |
| KR | 10-2018-0037691 A | 4/2018 | | |
| KR | 10-2018-0096923 A | 8/2018 | | |
| WO | WO-2017135649 A1 * | 8/2017 | ............. | G02B 27/64 |

* cited by examiner

LENS DRIVING APPARATUS CAPABLE OF FACILITATING AN OPERATION OF BONDING A COIL TO AN ELASTIC MEMBER, AND CAMERA MODULE AND OPTICAL DEVICE COMPRISING SAME

CROSS REFERENCE TO RELATED APPLICATIONS

This application is the National Phase of PCT International Application No. PCT/KR2020/006153, filed on May 11, 2020, which claims priority under 35 U.S.C. § 119 (a) to Patent Application No. 10-2019-0054306, filed in the Republic of Korea on May 9, 2019 and Patent Application No. 10-2019-0119200, filed in the Republic of Korea on Sep. 26, 2019, all of which are hereby expressly incorporated by reference into the present application.

TECHNICAL FIELD

Embodiments relate to a lens moving apparatus and a camera module and an optical device each including the same.

BACKGROUND ART

It is difficult to apply technology of a voice coil motor (VCM) used in existing general camera modules to a subminiature, low-power camera module, and therefore research related thereto has been actively conducted.

Demand for and production of electronic products, such as smartphones and mobile phones equipped with cameras have increased. Cameras for mobile phones are trending toward increased resolution and miniaturization. As a result, an actuator has also been miniaturized, increased in diameter, and been made multifunctional. In order to realize a high-resolution camera for mobile phones, improvement in performance of the camera for mobile phones and additional functions thereof, such as autofocusing, handshake correction, and zooming, are required.

DISCLOSURE

Technical Problem

Embodiments provide a lens moving apparatus and a camera module and an optical device each including the same, which are capable of facilitating an operation of bonding each of a sensing coil and a coil to an elastic member and of simplifying the bonding operation.

Embodiments provide a camera module having an autofocus feedback function without increasing the overall size thereof compared to a camera module having no autofocus feedback function.

Furthermore, embodiments provide a camera module capable of minimizing manufacturing costs using only a coil, in place of a sensing magnet and a Hall sensor, in order to perform position sensing.

Technical Solution

In one embodiment, a lens moving includes a housing, a bobbin disposed inside the housing, a coil coupled to the bobbin, a magnet disposed on the housing so as to face the coil, a base disposed so as to be spaced apart from the bobbin, a lower elastic member, which is coupled to the bobbin and includes a first elastic member, a second elastic member, a third elastic member, and a fourth elastic member which are disposed on the base, and a sensing coil, which is disposed on the housing so as to generate an induction voltage resulting from interaction with the coil, wherein a corner of the base and a corner of the housing form a coupling region in which the two corners are coupled to each other, and the sensing coil includes a portion disposed outside the coupling region.

The coupling region may include a column projecting from the corner of the base toward the housing, and a groove, which is formed in the corner of the housing and is coupled to the column.

The coil may be conductively connected to the first and second elastic members, and the sensing coil may be conductively connected to the third and fourth elastic members.

The coil may have a ring shape surrounding an outer surface of the bobbin, and the sensing coil may have a ring shape surrounding a lower portion of an outer surface of the housing.

The sensing coil may include a portion overlapping the magnet in an optical-axis direction, and may not overlap the coil in the optical-axis direction.

Each of the first and second elastic members may include an inner frame coupled to a lower portion of the bobbin, and the coil may be coupled at one end thereof to the inner frame of the first elastic member and at a remaining end thereof to the inner frame of the second elastic member.

Each of the third and fourth elastic members may include an outer frame coupled to a lower portion of the housing, and the sensing coil may be coupled at one end thereof to the outer frame of the third elastic member and at a remaining end thereof to the outer frame of the fourth elastic member.

Each of the first to fourth elastic members may include a terminal, which is bent and extends toward a first outer surface of the base.

The column of the base may be disposed inside the sensing coil.

The column of the base may be disposed outside the sensing coil.

The sensing coil may include a portion that is in contact with the outer surface of the column and overlaps the column in a direction perpendicular to the optical axis.

The sensing coil may include a portion that is in contact with the inner surface of the column and overlaps the column in a direction perpendicular to the optical axis.

The sensing coil may surround the lower portion of the outer surface of the housing.

Advantageous Effects

Embodiments are capable of facilitating an operation of bonding each of a sensing coil and a coil to an elastic member and of simplifying the bonding operation.

According to the embodiments, it is possible to minimize the size of a camera module having an autofocus feedback function.

Furthermore, it is also possible to easily apply a construction configured to sense the position of a lens according to the embodiments to a conventional camera module having no autofocus feedback function.

In addition, it is possible to minimize manufacturing costs compared to a model using a sensing magnet and a Hall sensor.

Furthermore, since a sensing magnet is not used, there is an advantage in that there is no need to consider magnetic-field interference with a drive magnet.

BEST MODE

Figure 1:
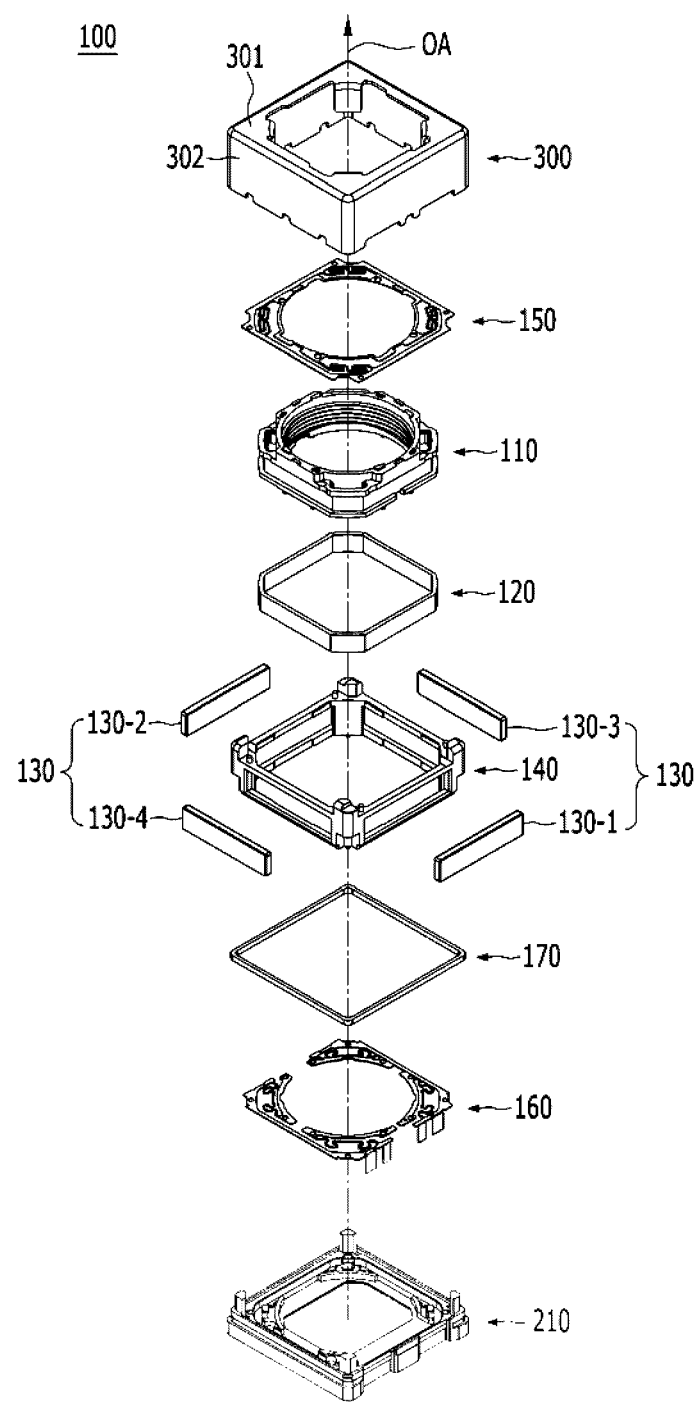
FIG. 1 is an exploded perspective view of a lens moving apparatus according to an embodiment.

Hereinafter, embodiments of the present invention will be described in detail with reference to the accompanying drawings.

The technical idea of the present invention may be embodied in many different forms, and should not be construed as being limited to the following embodiments set forth herein. One or more of components of the embodiments may be selectively combined with each other or replaced without departing from the technical spirit and scope of the present invention.

Unless otherwise particularly defined, terms (including technical and scientific terms) used in the embodiments of the present invention have the same meanings as those commonly understood by one of ordinary skill in the art to which this invention belongs. It will be further understood that commonly used terms, such as those defined in dictionaries, should be interpreted as having meanings consistent with their meanings in the context of the relevant art.

The terminology used in the embodiments of the present invention is for the purpose of describing particular embodiments only, and is not intended to limit the present invention. As used in the disclosure and the appended claims, the singular forms are intended to include the plural forms as well, unless the context clearly indicates otherwise. The phrase "at least one (or one or more) of A, B and C" may be interpreted as including one or more of all combinations of A, B and C.

Furthermore, when describing the components of the present invention, terms such as "first", "second", "A", "B", "(a)" or "(b)" may be used. Since these terms are provided merely for the purpose of distinguishing the components from each other, they do not limit the nature, sequence or order of the components.

It should be understood that, when an element is referred to as being "linked", "coupled" or "connected" to another element, the element may be directly "linked", "coupled" or "connected" to the another element, or may be "linked", "coupled" or "connected" to the another element via a further element interposed therebetween. Furthermore, it will be understood that, when an element is referred to as being formed "on" or "under" another element, it can be directly "on" or "under" the other element, or can be indirectly disposed with regard thereto, with one or more intervening elements therebetween. In addition, it will also be understood that "on" or "under" the element may mean an upward direction or a downward direction based on the element.

The "auto-focusing function" serves to automatically focus an image of a subject on the surface of an image sensor. The lens moving apparatus according to an embodiment may move an optical module, which is constituted of at least one lens, in the first direction, so as to perform auto-focusing.

In other words, the "auto-focusing function" may be defined as a function for automatically focusing an image of a subject by moving a lens in the optical-axis direction and thus adjusting the distance from the image sensor according to the distance from the subject in order to obtain a clear image of the subject on the image sensor. Here, the "auto-focusing" may correspond to "AF (Auto focus)". Furthermore, "closed-loop auto focus (CLAF) control" may be defined as control for performing feedback with regard to a lens position in real time by detecting the distance between the image sensor and the lens in order to realize accurate control of focus.

Hereinafter, the lens moving apparatus may be alternatively referred to as a "lens moving unit", a "VCM (Voice Coil Motor)" or an "actuator". Hereinafter, the term "coil"

may be interchangeably used with "coil unit", and the term "elastic member" may be interchangeably used with "elastic unit" or "spring".

In the follow description, the "terminal" may be alternatively referred to as a "pad", "electrode", "conductive layer" or "bonding portion".

For the convenience of description, although the lens moving apparatus according to an embodiment is described using a rectangular coordinate system (x, y, z), the lens moving apparatus may be described using some other coordinate systems, and the embodiments are not limited with regard thereto. In the respective drawings, the X-axis direction and the Y-axis direction mean directions perpendicular to an optical axis OA, i.e. the Z-axis. The Z-axis direction, which is the optical-axis direction, may be referred to as a "first direction", the X-axis direction may be referred to as a "second direction", and the Y-axis direction may be referred to as a "third direction".

Figure 2:
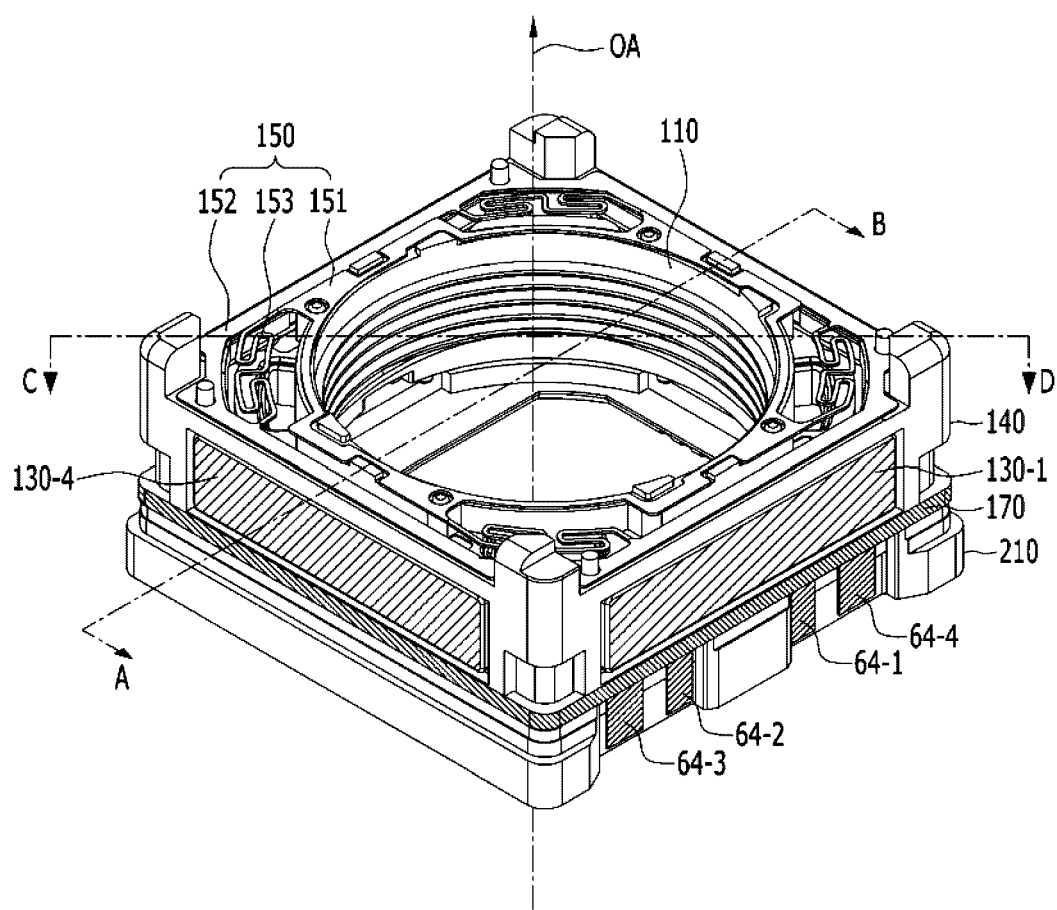
FIG. 2 is an assembled perspective view of the lens moving apparatus, from which a cover member is removed.

FIG. 1 is an exploded perspective of the lens moving apparatus 100 according to an embodiment of the present invention. FIG. 2 is an assembled perspective view of the lens moving apparatus 100, from which a cover member 300 is removed.

Referring to FIGS. 1 and 2, the lens moving apparatus 100 may include a bobbin 110, a coil 120, a magnet 130, a housing 140, a sensing coil 170, and an elastic member.

The lens moving apparatus 100 may further include at least one of a cover member 300 and a base 210. The elastic member may include at least one of an upper elastic member 150 and a lower elastic member 160.

First, the cover member 300 will be described.

The cover member 300 may accommodate the bobbin 110, the coil 120, the magnet 130, the housing 140, the elastic member and the sensing coil 170 in the reception space defined between the cover member 300 and the base 210.

The cover member 300 may be configured to have the form of a box, which is open at the lower surface thereof and include an upper plate 301 and side plates 302, and the lower ends of the side plates 302 of the cover member 300 may be coupled to a step 211 of the base 210. When viewed from above, the upper plate 301 of the cover member 300 may have a polygonal shape, for example, a rectangular shape or an octagonal shape.

The upper plate 301 of the cover member 300 may have a bore (or a hollow) through which a lens (not shown) coupled to the bobbin 110 is exposed to external light.

Although the cover member 300 may be made of a nonmagnetic material such as stainless steel in order to prevent attraction to the magnet 130, the cover member 300 may be alternatively made of a magnetic material so as to serve as a yoke.

The cover member 300 may include at least one projection 31, which extends toward the upper surface of the bobbin 110 from a region adjacent to the bore formed in the upper plate 301 thereof.

The at least one projection of the cover member 300 may be disposed or fitted into a groove 119 formed in the upper surface of the bobbin 110. For example, the at least one projection of the cover member 300 may serve as a yoke.

During AF operation, the projection 31 of the cover member 300 may come into contact with the bottom surface of the groove 119 in the bobbin 110, and may thus serve as a stopper for limiting the upward movement of the bobbin 110 within a predetermined range.

Next, the bobbin 110 will be described.

Figure 3A:
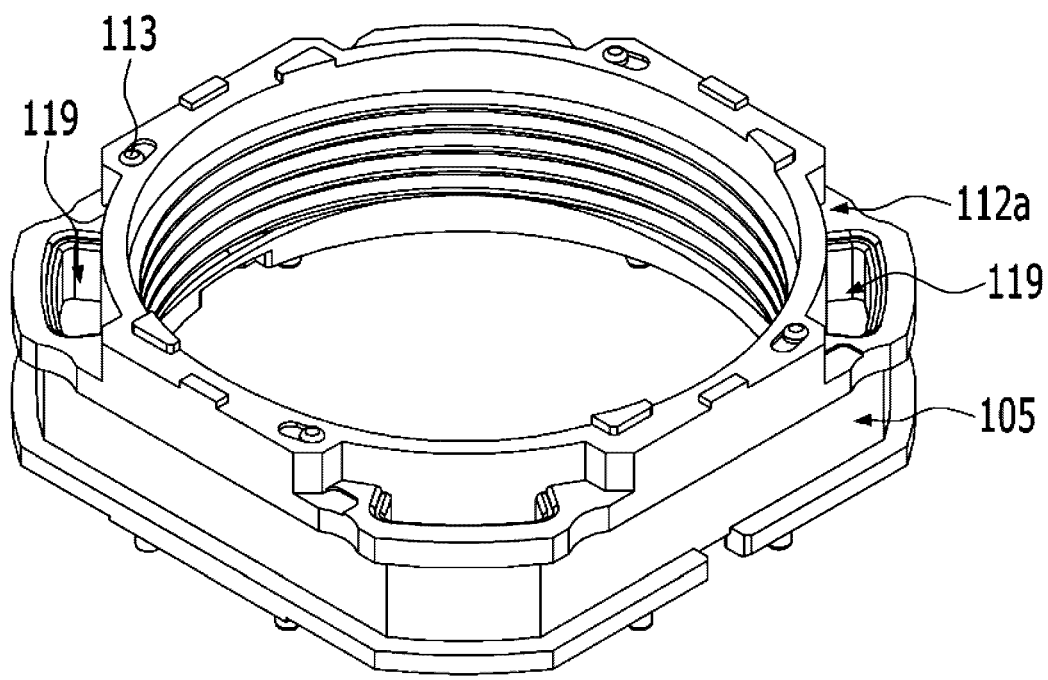
FIG. 3A is a perspective view of a bobbin.
Figure 3B:
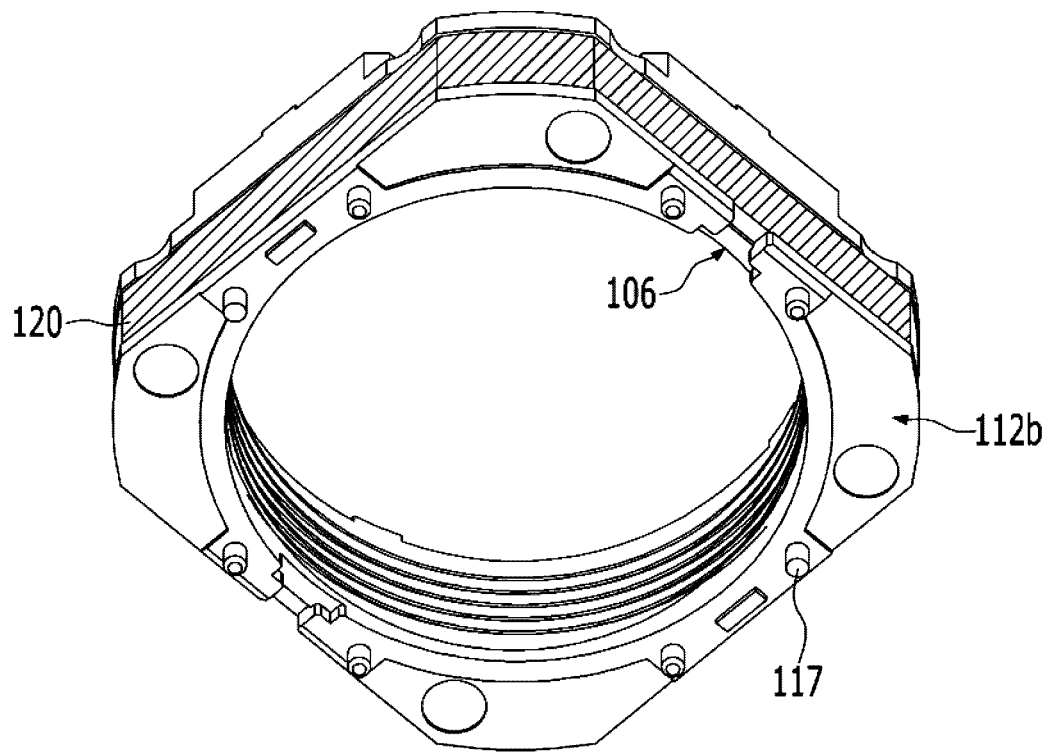
FIG. 3B is an assembled perspective view of the bobbin and a coil.

FIG. 3A is a perspective view of the bobbin 110 shown in FIG. 1. FIG. 3B is an assembled perspective view of the bobbin 110 and the coil 120.

Referring to FIGS. 3A and 3B, the bobbin 110 may be disposed in the housing 140, and may be moved in the direction of the optical axis OA or in a direction parallel to the optical axis by the electromagnetic interaction between the coil 120 and the magnet 130.

The bobbin 110 may have a bore or a hollow for mounting the lens or lens barrel therein. Although the bore (or the hollow) in the bobbin 110 may have a shape corresponding to the lens or lens barrel mounted therein, for example a circular shape or a polygonal shape, the disclosure is not limited thereto. For example, the bore in the bobbin 110 may have a hole shape, which is formed through the bobbin 110 in the optical-axis direction.

Although the lens or lens barrel may be directly coupled to the inner surface of the bobbin 110, the disclosure is not limited thereto. For example, the bobbin 110 may include the lens barrel (not shown) in which at least one lens is mounted, and the lens barrel may be coupled to the inner surface of the bobbin 110 in any of various ways. For example, although the inner surface of the bobbin 110 may be provided with a thread for coupling to the lens or lens module, another embodiment may not be provided with the thread.

The upper surface, the upper portion or the upper end of the bobbin 110 may be provided with at least one first coupler 113, which is to be coupled or fixed to the inner frame 151 of the upper elastic member 150.

The lower surface, the lower portion or the lower end of the bobbin 110 may be provided with at least one second coupler 117, which is to be coupled or fixed to the inner frame 161 of the lower elastic member 160.

For example, although each of the first coupler 113 and the second coupler 117 of the bobbin 110 may have the shape of a protrusion in FIGS. 3A and 3B, the disclosure is not limited thereto. In another embodiment, at least one of the first and second couplers of the bobbin 110 may have the shape of a coupling groove or flat surface.

A region of the upper surface of the bobbin 110 that corresponds to or is aligned with a first frame connector 153 of the upper elastic member 150 may be provided with a first escape groove 112a.

A region of the lower surface of the bobbin 110 that corresponds to or is aligned with a second frame connector 163 of the lower elastic member 160 may be provided with a second escape groove 112b.

When the bobbin 110 is moved in the first direction, spatial interference between the first and second frame connectors 153 and 163 and the bobbin 110 may be avoided by virtue of the first escape groove 112a and the second escaped groove 112b in the bobbin 110, and thus the first and second frame connectors 153 and 163 of the upper and lower elastic members 150 and 160 may be elastically deformed with ease.

In another embodiment, the first frame connector of the upper elastic member and the bobbin may be designed so as not to interfere with each other, and the bobbin may not have the first escape groove and/or the second escape groove.

The bobbin 110 may have at least one groove 105 formed in the outer surface thereof in which the coil 120 is disposed. The coil 120 may be disposed or seated in the groove 105 in the bobbin 110.

For example, the coil 120 may be disposed or directly wound in the groove 105 in the bobbin 110 in a clockwise direction or in a counterclockwise direction about the optical axis OA.

The number and shape of grooves 105 in the bobbin 110 may correspond to the number and shape of coils disposed on the outer surface of the bobbin 110. In another embodiment, the bobbin 110 may not have therein the groove in which the coil is seated, and the coil 120 may be disposed or directly wound around the outer surface of the bobbin 110.

The lower end of the outer surface of the bobbin 110 may have a groove 106 formed therein, through which the starting line (for example, one end) or the ending line (for example, the other end) of the coil 120 extends.

Next, the coil 120 will be described.

The coil 120 may be disposed on the bobbin 110, may be coupled or connected to the bobbin 110, or may be supported by the bobbin 110.

For example, the coil 120 may be disposed on the outer surface of the bobbin 110, and electromagnetic force may be generated as a result of the interaction between the magnet 130 disposed on the housing 140 and the coil 120 disposed on the bobbin 120. In order to create electromagnetic force resulting from the interaction with the magnet 130, electric power is supplied to the coil 120 or a drive signal is applied to the coil 120.

In order to generate an induction voltage caused by mutual induction with the sensing coil 170, the drive signal supplied to the coil 120 may be an AC signal, or may include both AC and DC components.

For example, the AC signal supplied to the coil 120 may be a sinusoidal signal or a pulse signal (for example, a PWM signal). For example, the drive signal may be of a current type or a voltage type.

For example, the DC component of the drive signal may move the AF operation unit in the optical-axis direction by virtue of the interaction with the magnet. Although the AC component of the drive signal may be supplied in order to generate the induction voltages caused by the interaction with the sensing coil 170, the disclosure is not limited thereto.

By virtue of electromagnetic force resulting from the interaction between the coil 120 and the magnet 130, the bobbin 110, which is elastically supported by the upper and lower elastic members 150 and 160, may be moved in the optical-axis direction or in the first direction.

By controlling the drive signal supplied to the coil 120, it is possible to control movement or motion of the bobbin 110 in the first direction, and it is thus possible to perform an autofocusing function.

The coil 120 may be disposed on the outer surface of at the bobbin 110 so as to surround the outer surface of the bobbin 110 about the optical axis in a clockwise or counterclockwise direction. For example, the coil 120 may be disposed in or wound in the groove 150 formed in the outer surface of the bobbin 110.

For example, the coil 120 may be configured to have a closed curve shape or a ring shape.

In another embodiment, the coil 120 may be embodied as a coil ring, which is wound in a clockwise or counterclockwise direction about an axis perpendicular to the optical axis. Although the number of coil rings may be the same as the number of magnets 130, the disclosure is not limited thereto.

The coil 120 may be conductively connected to at least one of the upper and lower elastic members 150 and 160. The drive signal may be applied to the coil 120 via at least one of the upper and lower elastic members 150 and 160. For example, the coil 120 may be connected or coupled to two elastic members 160-1 and 160-2 of the lower elastic member 160, and the drive signal may be applied to the coil 120 via the two elastic members 160-1 and 160-2.

Next, the housing 140 will be described.

Figure 4A:
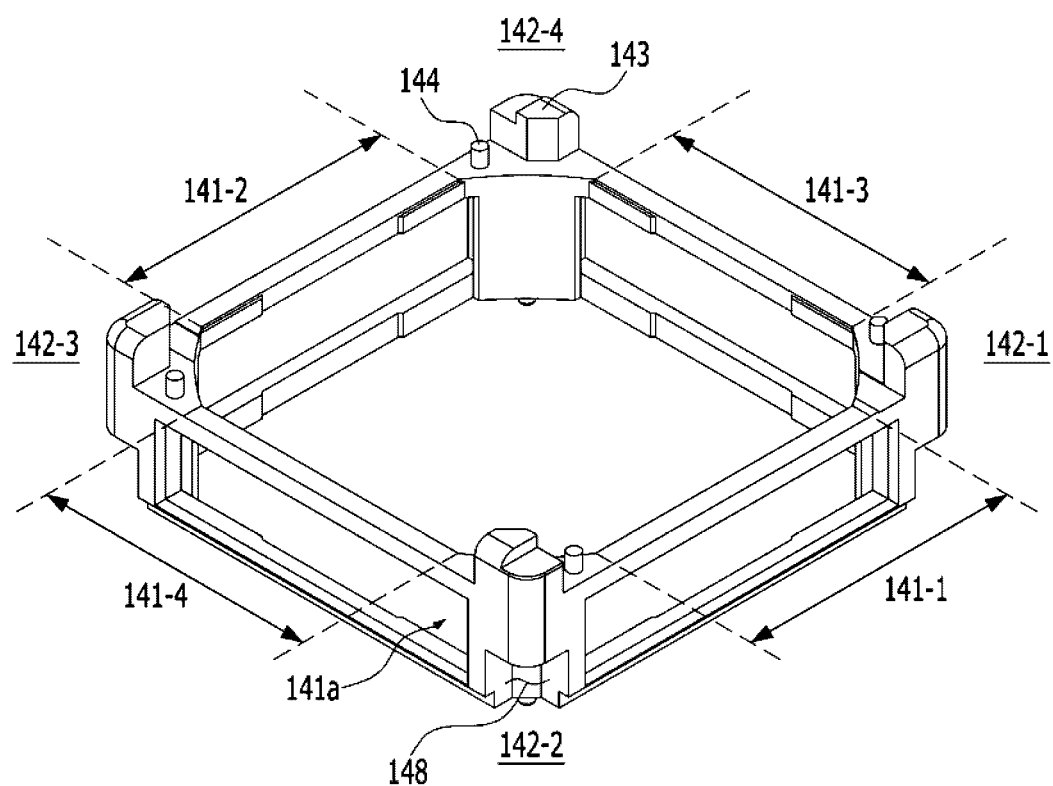
FIG. 4A is a perspective view of a housing.
Figure 4B:
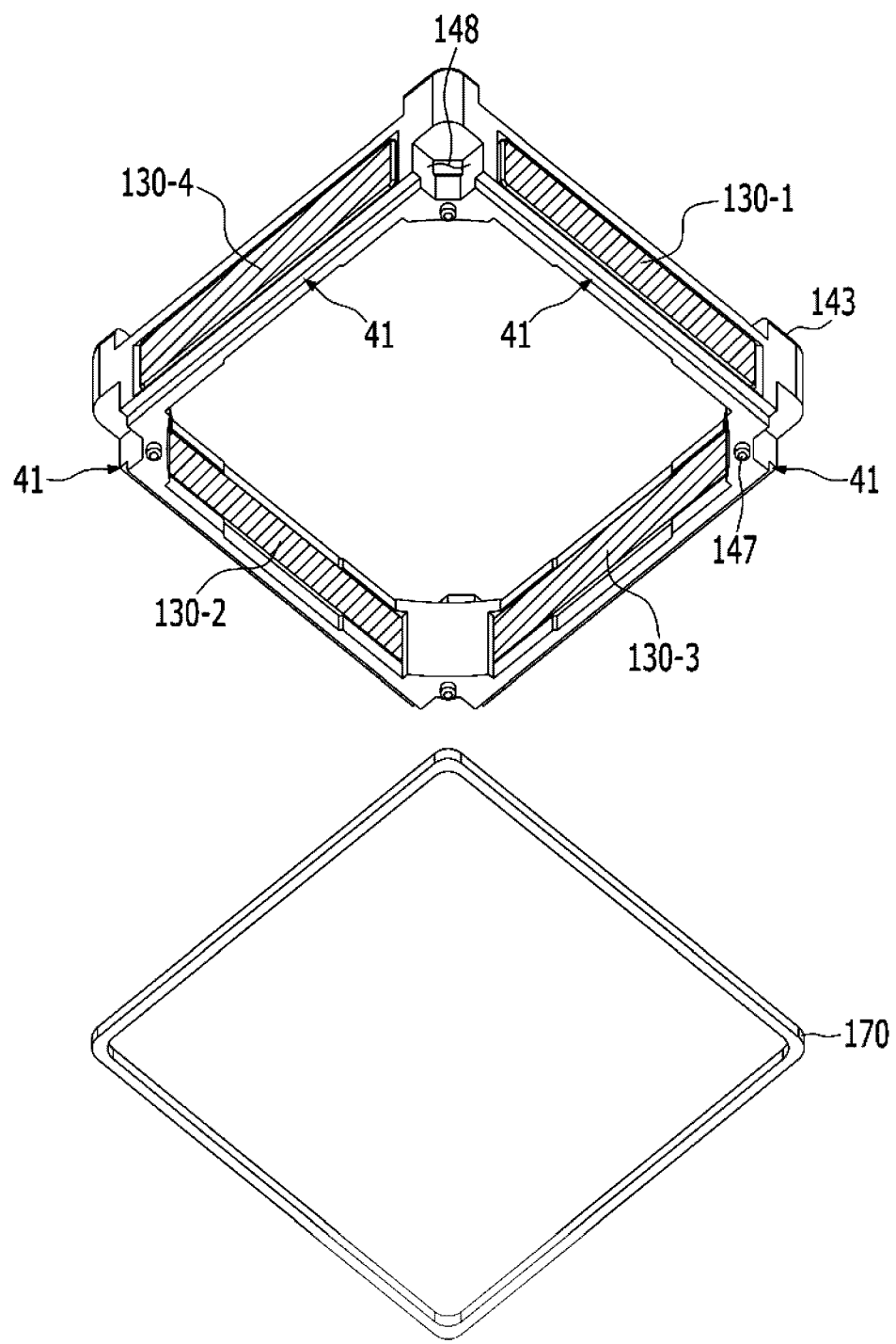
FIG. 4B is a perspective view of the housing, a sensing coil and a magnet.

FIG. 4A is a perspective view of the housing 140 shown in FIG. 1. FIG. 4B is an assembled perspective view of the housing 140, the sensing coil 170, and the magnet 130.

Referring to FIGS. 4A and 4B, the housing 140 may support the magnet 130, and may accommodate the bobbin 110 such that the bobbin 110 is movable in the first direction.

The housing 140 may have be formed to have the shape of a hollow column overall.

The housing 140 may have a bore (or a hollow) for accommodating the bobbin 110 therein, and the bore in the housing 140 may be a through hole, which is formed through the housing 140 in the optical-axis direction.

The housing 140 may include side portions (or "first side portions") 141-1 to 141-4 and corner portions (or "second side portions") 142-1 to 142-4.

For example, the housing 140 may include a plurality of side portions 141-1 to 141-4 and a plurality of corner portions 142-1 to 142-4, which define a polygonal (for example, a rectangular or octagonal) bore or a circular bore. Here, the corner portions of the housing 140 may be referred to as "columns".

For example, the side portions 141-1 to 141-4 of the housing 140 may be disposed on positions corresponding to the side plates 302 of the cover member 300, and a side portion of the housing 140 and a side plate 302 of the cover member 300, which correspond to each other, may be parallel to each other.

For example, the side portions 141-1 to 141-4 of the housing 140 may be portions corresponding to the sides of the housing 140, and the corner portions 142-1 to 142-4 of the housing 140 may be portions corresponding to the corners of the housing 140.

The inner surface of each of the corner portions 142-1 to 142-4 of the housing 140 may be a flat surface, a chamfered surface or a curved surface.

The magnet 130 may be disposed or mounted on at least one of the side portions 141-1 to 141-4 of the housing 140. For example, the first to fourth side portions 141- to 141-4 of the housing 140 may have therein seating portions 141*a* in which the magnets 130-1 to 130-4 are seated, disposed or fixed.

Although each of the seating portions 141*a* may be an opening or a through hole, which is formed through a corresponding one of the side portions 141-1 to 141-4 of the housing 140 in FIG. 4A, the disclosure is not limited thereto. In another embodiment, the seating portion 141*a* may be a groove or a recess.

The housing 140 may include a support 18 provided adjacent to the seating portion 141*a* in order to support the periphery of the first surface of the magnet 130, which faces the coil 120.

The support 18 may be positioned adjacent to the inner surface of the housing 140, and may project in a horizontal direction from the side surface of the seating portion 141*a*. For example, the support 18 may include a tapered portion or a sloping surface. In another embodiment, the housing 140 may not include the support 18.

Referring to FIG. 4B, the housing 140 may have a seating groove 41, in which the sensing coil 170 is disposed, received or wound.

The seating groove 41 may be formed in the lower portion or the lower end of the outer surface of at least one of the side portions 141-1 to 141-4 and the corner portions 142-4 of the housing 140.

For example, the seating groove 41 may be formed in the lower portions or the lower ends of the outer surfaces of the side portions 141-1 to 141-4 of the housing 140.

For example, the seating groove 41 may be depressed from the outer surfaces of the side portions 141-1 to 141-4 of the housing 140 adjacent to the lower surface of the housing 140.

The depth of the seating groove 41 may be greater than or equal to the thickness of the sensing coil 170, which is wound in the seating groove 41. Here, the thickness of the sensing coil 170 may be the length in a direction perpendicular to the optical axis.

For example, the sensing coil 170 disposed in the seating groove 41 may not project from the outer surfaces of the side portions 141-1 to 141-4 of the housing 140. The reason for this is to prevent the sensing coil 170 disposed in the seating groove 41 from being separated outwards from the seating groove 141b. In another embodiment, the sensing coil 170 disposed in the seating groove in the housing 140 may project from the outer surfaces of the side portions 141-1 to 141-4 of the housing 140.

The seating groove 41 may be provided under the seating portion 141a, in which the magnet 130 is seated. For example, although the seating groove 41 may not overlap the seating portion 141a of the housing 140 in a direction perpendicular to the optical axis OA, the disclosure is not limited thereto.

For example, although the seating groove 41 in the housing 140 may be open at the lower face thereof, the disclosure is not limited thereto. Furthermore, although the seating groove 41 in the housing 140 may be open at the outer surfaces of the side portions 141-1 to 141-4, the disclosure is not limited thereto.

For example, the seating groove 41 in the housing 140 may have at least one of a first opening, which is formed in the lower surface of the housing 140, and a second opening, which is formed in the outer surfaces of the side portions 141-1 to 141-4 of the housing 140. It is easy to dispose or mount the sensing coil 170 at the housing 140 by virtue of the first opening and/or the second opening of the seating groove 41, and it is easy to perform bonding for coupling the sensing coil 170 to the lower elastic member 160 by virtue of the first opening of the seating groove 41.

In another embodiment, the seating groove in the housing 140 may be spaced apart from the lower surface of the housing 140 in the optical-axis direction.

The corner portions 142-1 to 142-4 of the housing 140 may include a first coupling region to be coupled to the corners of the base 210.

The corners of the base 210 may include a second coupling region to be coupled to the first coupling region of the housing 140. The first coupling region may include at least one of a groove and a protrusion (or a column), and the second coupling region may include at least one of a groove and a protrusion (or a column).

For example, although the first coupling region may be a groove and the second coupling region may be a protrusion (or a column), the disclosure is not limited thereto, and the reverse configuration is also possible. Alternatively, the first coupling region may include a first groove and a first protrusion (or a first column), and the second coupling region may include a second protrusion to be coupled to the first groove in the first coupling region and a second groove to be coupled to the first protrusion of the first coupling region.

The above-mentioned first and second coupling regions may form a coupling region for coupling the housing 140 to the base 210.

For example, each of the corner portions 142-1 to 142-4 of the housing 140 may be provided in the lower portion of the outer surface thereof with a guide groove (or a "groove") 148, into which a corresponding one of columns (for example, 216a to 216d) of the base 210 is fitted, fastened or coupled.

Here, the columns (for example, 216a to 216d) of the base 210 and the groove 148 in the housing 140 may form a coupling region.

In order to prevent the housing 140 from directly colliding with the inner surface of the upper plate 301 of the cover member 300, the housing 140 may include stoppers 143 formed at the upper portion, the upper surface or the upper end of the housing 140. Here, the stoppers 143 may be alternatively referred to as "bosses" or "protrusions".

For example, although the stoppers 143 may be formed at the corner portions 142-1 to 142-4 of the housing 140, the disclosure is not limited thereto. In another embodiment, the stoppers 143 may be formed at at least one of the side portions 141-1 to 141-4 and the corner portions 142-1 to 142-4 of the housing 140.

For example, although the upper surfaces of the stoppers 143 of the housing 140 may be in contact with the inner surface of the upper plate 301 of the cover member 300, the disclosure is not limited thereto. In another embodiment, the two surfaces may not be in contact with each other.

The upper surface, the upper end or the upper portion of the housing 140 may be provided with at least one first coupler 144, to which the outer frame 152 of the upper elastic member 150 is coupled. Furthermore, the lower surface, the lower portion or the lower end of the housing 140 may be provided with at least one second coupler 147, to which the outer frame 162 of the lower elastic member 160 is coupled.

Although each of the first and second couplers 144 and 147 of the housing 140 may have the shape of a protrusion in FIGS. 4A and 4B, the disclosure is not limited thereto. In another embodiment, at least one of the first and second couplers 144 and 147 may have a groove shape, or may be a flat surface.

For example, by means of an adhesive (not shown) such as silicone or epoxy, the guide groove 148 in the housing 140 may be coupled to the columns (for example, 216a to 216d) of the base 210, and the housing 140 may be coupled to the base 210.

Next, the magnet 130 will be described.

At the initial position of the AF operation unit (for example, the bobbin 110), the magnets 130 may be disposed on the side portions 141-1 to 141-4 of the housing 140 so as to correspond to or face the coil 120.

The initial position of the AF operation unit (for example, the bobbin 110) may be the original position of the AF operation unit in the state in which no electric power or drive signal is applied to the coil 120 or the position at which the AF operation unit is located as the result of the upper and lower elastic members 150 and 160 being elastically deformed due only to the weight of the AF operation unit.

In addition, the initial position of the AF operation unit (for example, the bobbin 110) may be the position at which the AF operation unit is located when gravity acts in the direction from the bobbin 110 to the base 210 or when gravity acts in the direction from the base 210 to the bobbin 110.

For example, the AF operation unit may include the bobbin 110 and components which are mounted on the bobbin 110. For example, the AF operation unit may include the bobbin 110 and the coil 120, and may further include a lens or a lens barrel when the lens or the lens barrel is mounted on the AF operation unit.

An embodiment is able to perform bidirectional operation in which the AF operation unit is movable forwards (or upwards) and rearwards (or downwards) from the initial position of the AF operation unit by virtue of the interaction between the coil 120 and the magnet 130. Another embodiment is able to perform unidirectional operation in which the AF operation unit is movable only forwards (or upwards) from the initial position of the AF operation unit by virtue of the interaction between the coil 120 and the magnet 130.

At the initial position of the AF operation unit, the magnets 130 may be respectively disposed in the seating portions 141a in the housing 140 so as to overlap the coil 120 in the second or third direction, perpendicular to the optical-axis direction.

In another embodiment, the seating portions 141a may not be formed in the side portions 141-1 to 141-4 of the housing 140, and the magnets 130 may be disposed on the outer surfaces or the inner surfaces of the side portions 141-1 to 141-4 of the housing 140.

Although the magnet 130 includes first to fourth magnets 130-1 to 130-4 respectively disposed in the first to fourth side portions 141-1 to 141-4 of the housing 140 in an embodiment, the disclosure is not limited thereto. The number of magnets 130 may be two or more. For example, another embodiment may include two magnets respectively disposed on two side portions of the housing 140, which face each other.

Although each of the magnets 130-1 to 130-4 may have a shape corresponding to the outer surfaces of the side portions 141-1 to 141-4 of the housing 140, for example, a polyhedral shape (for example, a rectangular parallelepiped shape), the disclosure is not limited thereto.

In another embodiment, the magnet 130 may be disposed on at least one of the corner portions of the housing 140. Here, the corner portions may be provided with a seating portion in which the magnet 130 is disposed.

Each of the magnets 130-1 to 130-4 may be a monopolar magnetized magnet, which includes two different poles and an interface plane naturally formed between the two different poles.

For example, each of the magnets 130-1 to 130-4 may be a monopolar magnetized magnet in which a first surface thereof that faces the coil 120 is the N pole and a second surface thereof opposite the first surface is the S pole. However, the disclosure is not limited thereto, and the reverse disposition of the N pole and the S pole is also possible.

In another embodiment, in order to increase the electromagnetic force, each of the magnets 130-1 to 130-4 may be a bipolar magnetized magnet divided into two parts in a direction perpendicular to the optical axis. Here, although the magnets 130-1 to 130-4 may be embodied by a ferrite magnet, an alnico magnet, a rare-earth magnet or the like, the disclosure is not limited thereto.

When each of the magnets 130-1 to 130-4 is a bipolar magnetized magnet, each of the magnets 130-1 to 130-4 may include a first magnet part, a second magnet part, and a partition wall disposed between the first magnet part and the second magnet part.

The first magnet part may include an N pole, an S pole, and a first interface plane between the N pole and the S pole. Here, the first interface plane may be a portion that has substantially no magnetism and has a zone having almost no polarity, and may be a portion that is naturally formed in order to form a magnet composed of one N pole and one S pole.

The second magnet part may include an N pole, an S pole, and a second interface plane between the N pole and the S pole. Here, the second interface plane may be a portion that has substantially no magnetism and has a zone having almost no polarity, and may be a portion that is naturally formed in order to form a magnet composed of one N pole and one S pole.

The partition wall may separate or isolate the first magnet part and the second magnet part from each other, and may be a portion having substantially no magnetism or polarity. For example, the partition wall may be a nonmagnetic material, air or the like. That is, the partition wall may be considered a "neutral zone".

The partition wall may be a portion that is artificially formed when the first magnet part and the second magnet part are magnetized, and the width of the partition wall may be greater than the width of each of the first interface and the second interface. Here, the width of the partition wall may be the length of the partition wall in a direction toward the second magnet part from the first magnet part.

Although the first surface of each of the magnets 130-1 and 130-2 may be configured as a flat surface, the disclosure is not limited thereto. The first surface of each of the magnets 130-1 and 130-2 may be configured as a curved surface, a sloped surface or a tapered surface. For example, the first surface of each of the magnets 130-1 to 130-4 may be the surface that faces the outer surface of the bobbin 110 and/or the coil 120.

Next, the upper elastic member 150 and the lower elastic member 160 will be described.

Figure 5A:
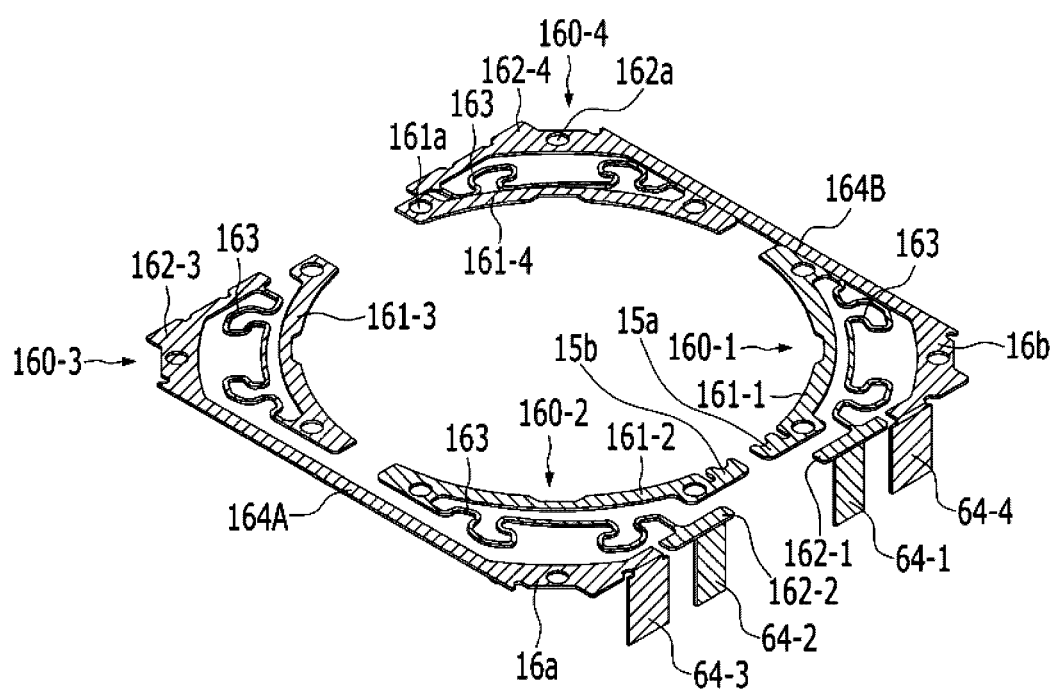
FIG. 5A is a perspective view of a lower elastic member.
Figure 5B:
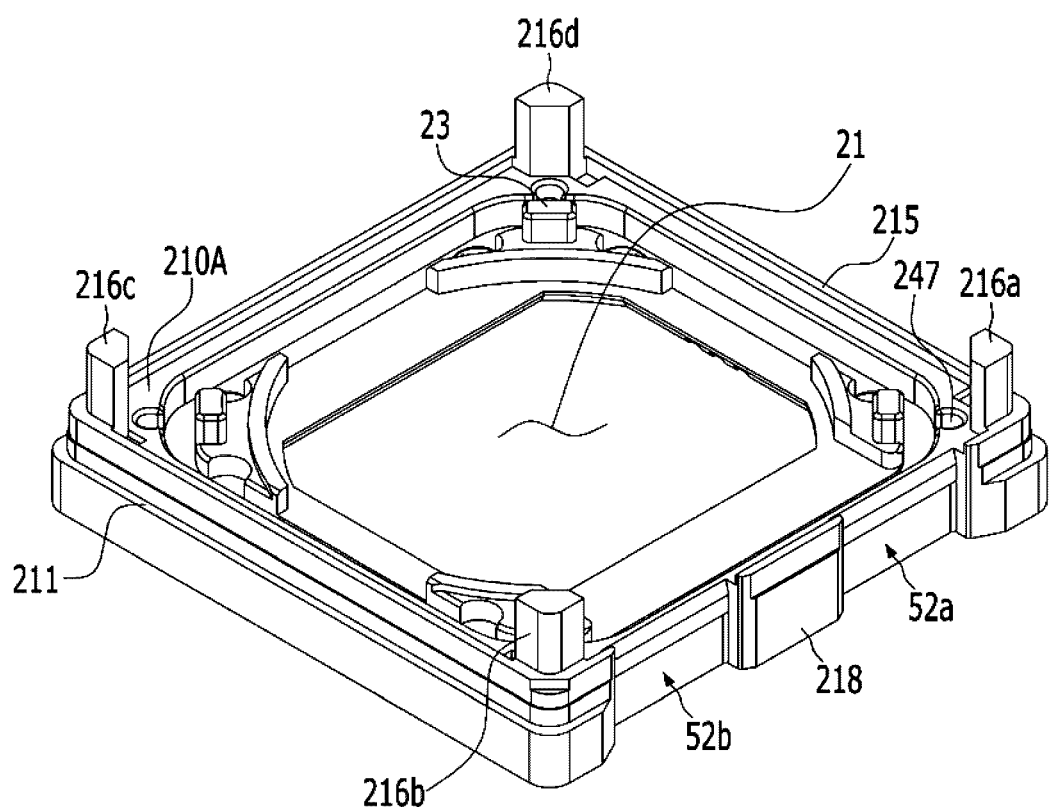
FIG. 5B is a perspective view of a base.
Figure 5C:
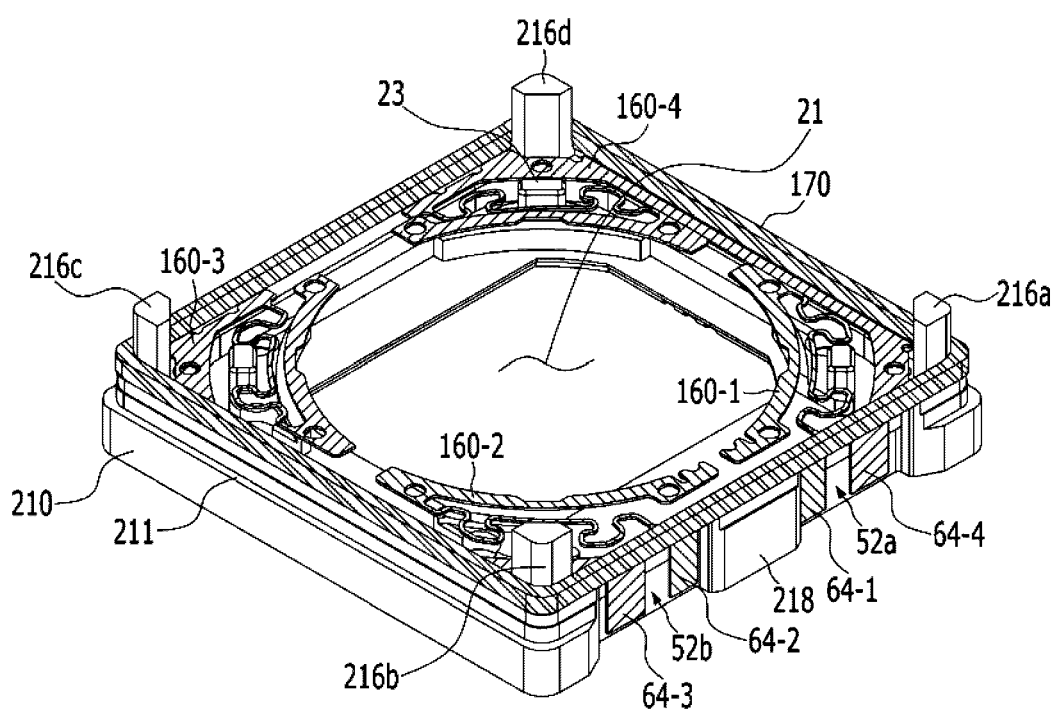
FIG. 5C is a perspective view of the base and the lower elastic member.

FIG. 5A is a perspective view of the lower elastic member 160. FIG. 5B is a perspective view of the base 210. FIG. 5C is a perspective view of the base 210 and the lower elastic member 160.

Referring to FIG. 2 and FIGS. 5A to 5C, the upper elastic member 150 and the lower elastic member 160 may be coupled both to the bobbin 110 and to the housing 140 so as to elastically support the bobbin 110.

For example, the upper elastic member 150 may be coupled to the upper portion (or the upper surface or the upper end) of the bobbin 110 and/or the upper portion (or the upper surface or the upper end) of the housing 140.

The lower elastic member 160 may be coupled to the lower portion (or the lower surface or the lower end) of the bobbin 110 and/or the lower portion (or the lower surface or the lower end) of the housing 140.

Although the upper elastic member 150 is not divided into a plurality of elastic units in FIG. 2, the disclosure is not limited thereto. In another embodiment, the upper elastic member 150 may include a plurality of elastic units, which are spaced apart from each other.

Referring to FIG. 2, the upper elastic member 150 may include a first inner frame 151 coupled to the upper portion of the bobbin 110, a first outer frame 152 coupled to the upper portion of the housing 140, and a first frame connector 153 connecting the first inner frame 151 to the second outer frame 152. Hereinafter, the inner frame may be alternatively referred to as an "inner part", the outer frame may be alternatively referred to as an "outer part", and the frame connector may be alternatively referred to as a "connector".

The first inner frame 151 of the upper elastic member 150 may have formed therein a hole 151a, which is for coupling to the first coupler 113 of the bobbin 110, and the first outer frame 152 may have formed therein a hole 152a, which is for coupling to the first coupler 144 of the housing 140.

Referring to FIG. 5A, the lower elastic member 160 may include an elastic member, which is divided or separated into two or more, and may be coupled to the bobbin 110. For example, the elastic members may be referred to as "lower elastic members", "elastic units" or "springs".

For example, the lower elastic member 160 may include first to fourth elastic members 160-1 to 160-4, which are spaced apart from each other, and the first to fourth elastic members 160-1 to 160-4 may be conductively isolated from each other.

At least one of the first to fourth elastic members 160-1 to 160-4 may include second inner frames 161-1 to 161-4 coupled to the lower portion of the bobbin 110, second outer frames 162-1 to 162-4 coupled to the lower portion of the housing 140, and second connectors 163 for coupling the second inner frames 161-1 to 161-4 to the second outer frames 162-1 to 162-4.

For example, the coil 120 may be conductively connected to the first and second elastic members 160-1 and 160-2. For example, the coil 120 may be coupled at one end (or a first end) thereof to the first elastic member 160-1, and may be coupled at the other end (or a second end) thereof to the second elastic member 160-2.

The second inner frames 161-1 to 161-4 may have therein a hole 161a for coupling to the second coupler 117 of the bobbin 110, and the second outer frames 162-1 to 162-4 may have therein holes 162a for coupling to the second coupler 147 of the housing 140.

For example, one end of the second inner frame 161-1 of the first elastic member 160-1 may be provided with a first bonding portion (or a "first bonding region) 15a, to which one end of the coil 120 is coupled, and one end of the second inner frame 161-2 of the second elastic member 160-2 may be provided with a second bonding portion (or a "second bonding region"), to which the other end of the coil 120 is coupled.

For example, by means of solder or a conductive adhesive member, the one end of the coil 120 may be coupled to the first bonding portion 15a of the inner frame 161 of the first elastic member 160-1, and the other end of the coil 120 may be coupled to the second bonding portion 15b of the inner frame 161 of the second elastic member 160-2.

One end of the second outer frame 162-3 of the third elastic member 160-3 may be provided with a first bonding portion (or a first bonding region) 16a, to which one end of the sensing coil 170 is coupled, and one end of the second outer frame 162-4 of the fourth elastic member 160-4 may be provided with a second bonding portion (a second bonding region) 16b, to which the other end of the sensing coil 170 is coupled.

The reason why the first and second bonding portions 15a and 15b of the first and second elastic members 160-1 and 160-2 are provided at the second inner frames 161-1 and 161-2 is to make it easy to perform bonding to the coil 120 because the second inner frames 161-1 and 161-2 of the first and second elastic members 160-1 and 160-2 are positioned closer to the bobbin 110 than to the second outer frames 162-1 and 162-2 of the first and second elastic members 160-1 and 160-2.

Furthermore, the reason why the first and second bonding portions 16a and 16b of the third and fourth elastic members 160-3 and 160-4 are provided at the second outer frames 162-3 and 162-4 is to make it easy to perform bonding to the sensing coil 170 because the second outer frames 162-3 and 162-4 of the third and fourth elastic members 160-3 and 160-4 are positioned closer to the housing 140 than to the second inner frames 161-3 and 161-4 of the third and fourth elastic members 160-3 and 160-4.

For example, the first and second bonding portions 15a, 15b, 16a, and 16b of the first to fourth elastic members 160-1 to 160-4 may have therein guide grooves for guiding the one end and the other end of the coil 120 and the sensing coil 170.

In the first and second bonding portions 15a, 15b, 16a, and 16b described above, the term "bonding portion" may be interchangeably used with "pad portion", "connecting terminal", "solder portion", or "electrode portion".

Although each of the upper elastic member 150 and the lower elastic member 160 may be embodied as a leaf spring, the disclosure is not limited thereto. Each of the upper and lower elastic members 150 and 160 may be embodied as a coil spring, a suspension wire, or the like.

Each of the first frame connector 153 and the second frame connector 163 of the upper elastic member 150 and the lower elastic member 160 may be bent or curved (or may be formed into a curved line) at least once so as to define a predetermined pattern. The upward and/or downward movement of the bobbin 110 in the first direction may be flexibly (or elastically) supported through changes in position and fine deformation of the first and second frame connectors 153 and 163.

For example, in order to prevent an oscillation phenomenon during movement of the bobbin 110, a damper may be disposed between the first frame connector 153 and the upper surface (for example, the first escape groove 112a) of the bobbin 110. Furthermore, a damper (not shown) may also be disposed between the second frame connector 163 of the lower elastic member 160 and the lower surface (for example, the second escape groove 112b) of the bobbin 110.

For example, a damper may be applied to the coupling portion between each of the bobbin 110 and the housing 140 and the upper elastic member 150 or to the coupling portion between each of the bobbin 110 and the housing 140 and the lower elastic member 160. For example, the damper may be gel-type silicone.

For example, although the first to fourth elastic members 160-1 to 160-4 may be separated or spaced apart from each other at the side portions 141-1 to 141-4 of the housing 140, the disclosure is not limited thereto.

The first elastic member 160-1 may include a first terminal 64-1, which is connected to the outer surface of the second outer frame 162 of the first elastic member 160-1 and which is bent at the second outer frame 162-1 of the first elastic member 160-1 and extends toward the base 210.

The second elastic member 160-2 may include a second terminal 64-2, which is connected to the outer surface of the second outer frame 162 of the second elastic member 160-2 and which is bent at the second outer frame 162-2 of the second elastic member 160-2 and extends toward the base 210.

The third elastic member 160-3 may include a third terminal 64-3, which is connected to the outer surface of the second outer frame 162-3 of the third elastic member 160-3 and which is bent at the second outer frame 162-3 of the third elastic member 160-3 and extends toward the base 210.

The fourth elastic member 160-4 may include a fourth terminal 64-4, which is connected to the outer surface of the second outer frame 162-4 of the fourth elastic member 160-4 and is bent at the second outer frame 162-4 of the fourth elastic member 160-4 and extends toward the base 210.

For example, the first terminal 64-1 of the first elastic member 160-1 may extend toward the first outer surface 218 of the base 210 from the second outer frame 162-1 of the first elastic member 160-1.

For example, the second terminal 64-2 of the second elastic member 160-2 may extend toward the first outer surface 218 of the base 210 from the second outer frame 162-2 of the second elastic member 160-2.

For example, the third terminal 64-3 of the third elastic member 160-3 may extend toward the first outer surface 218 of the base 210 from the second outer frame 162-3 of the third elastic member 160-3.

For example, the third elastic member 160-3 may include a first of second outer frame coupled to the second corner portion of the housing 140, a second of second outer frame coupled to the third corner portion of the housing 140, a first connecting frame 164A connecting the first of second outer frame to the second of second outer frame, and the third terminal 64-3, which extends toward the first outer surface 218 of the base 210 from one end of the first of second outer frame.

For example, the first bonding portion 16a of the third elastic member 160-3 may be provided at the first of second outer frame of the third elastic member 160-3.

For example, the fourth terminal 64-4 of the fourth elastic member 160-4 may extend toward the first outer surface 218 of the base 210 from the second outer frame 162-4 of the fourth elastic member 160-4.

For example, the fourth elastic member 160-3 may include a third of second outer frame coupled to the first corner portion of the housing 140, a fourth of second outer frame coupled to the fourth corner portion of the housing 140, a second connecting frame 164B connecting the third of second outer frame to the fourth of second outer frame, and the fourth terminal 64-4, which extends toward the first outer surface 218 of the base 210 from one end of the third of second outer frame.

For example, the second bonding portion 16b of the fourth elastic member 160-4 may be provided at the third of second outer frame of the fourth elastic member 160-4.

For example, the first to fourth terminals 64-1 to 64-4 of the first to fourth elastic members 160-1 to 160-4 may be disposed on the first outer surface 218 of the base 210 so as to be spaced apart from each other, and may be in contact with the first outer surface 218 of the base 210.

For example, the first and fourth terminals 64-1 and 64-4 of the first and fourth elastic members 160-1 and 160-4 may be disposed, seated or fitted in a first depression 52a formed in the outer side surface 218 of the base 210. Furthermore, the second and third terminals 64-2 and 64-3 of the second and third elastic members 160-2 and 160-3 may be disposed, seated or fitted in a second depression 52b formed in the first outer surface 218 of the base 210. Here, the depression may be alternatively referred to as a "groove".

The first to fourth terminals 64-1 to 64-4 of the first to fourth elastic members 160-1 to 160-4 may be exposed from the base 210, and the first to fourth terminals 64-1 to 164-4 may be conductively isolated from each other.

For example, the inner surface of the first and fourth terminals 64-1 and 64-4, disposed in the first depression 52a in the base 210, may be in contact with one surface (for example, the bottom surface) of the first depression 52a, and the outer surface of the first and fourth terminals 64-1 and 64-4 may be exposed from the outer surface (for example, the first outer surface) of the base 210. The outer surface of the first and fourth terminals 64-1 and 64-4 may be the surface opposite the inner surface of the first and fourth terminals 64-1 and 64-4.

Furthermore, the inner surface of the second and third terminals 64-2 and 64-3 disposed in the second depression 52b in the base 210 may be in contact with one surface (for example, the bottom surface) of the second depression 52b, and the outer surface of the second and third terminals 64-2 and 64-3 may be exposed from the outer surface (for example, the first outer surface) of the base 210. The outer surface of the second and third terminals 64-2 and 64-3 may be the surface opposite the inner surface of the second and third terminals 64-2 and 64-3.

For example, although the lower end of each of the first to fourth terminals 64-1 to 64-4 may be exposed from the lower surface of the base 210, the disclosure is not limited thereto. In another embodiment, the lower end of each of the first to second terminals 64-1 to 64-4 may not be exposed from the lower surface of the base 210.

Although the depth of each of the depressions 52a and 52b may be greater than the thickness of each of the terminals 64-1 to 64-4 and the outer surfaces of the terminals 64-1 to 64-4 disposed in the depressions 52a and 52b may not project outwards from the depressions 52a and 52b, the disclosure is not limited thereto. In another embodiment, the outer surfaces of the terminals 64-1 to 64-4 may project outwards from the depressions 52a and 52b.

Referring to FIG. 4A and FIGS. 5A to 5C, the base 210 may include side portions, which correspond to or face respective side portions 141-1 to 141-4 of the housing 140, and corner portions, which correspond to or face the corner portions 142-1 to 142-4 of the housing 140.

For example, the first elastic member 160-1 may be disposed on a portion of the first side portion of the base 210, at a portion of the third side portion of the base 210, and at the first corner portion of the base 210 between the first side portion and the third side portion of the base 210.

For example, the second elastic member 160-2 may be disposed on another portion of the first side portion of the base 210, at a portion of the fourth side portion of the base 210, and at the second corner portion of the base 210 disposed between the first side portion and the fourth side portion of the base 210.

For example, the third elastic member 160-3 may be disposed on another portion of the first side portion of the base 210, at the second corner portion, at the fourth side portion of the base 210, at a portion of the second side portion of the base 210, and at the third corner portion of the base 210. The third corner portion of the base 210 may be disposed between the second side portion and the fourth side portion of the base 210.

For example, the fourth elastic member 160-4 may be disposed on a portion of the first side portion of the base, at the first corner portion, t the third side portion, at the fourth corner portion, and at another portion of the second side portion. The fourth corner portion of the base 210 may be disposed between the second side portion and the third side portion of the base 210.

For example, the first side portion and the second side portion of the base 210 may be positioned opposite each other, or may face each other in the first axial direction (for example, in the x-axis direction). For example, the third side portion and the fourth side portion of the base 210 may be positioned opposite each other, or may face each other in the second axial direction (for example, in the y-axis direction) perpendicular to the first axial direction.

For example, the first to fourth terminals 64-1 to 64-4 may be disposed on the outer surface of the first side portion of the base 210.

For example, the first to fourth terminals 64-1 to 64-4 may be conductively connected to external wires or external devices via conductive adhesive members (for example, solder).

For example, the first and second terminals 641 and 64-2 may receive electrical power or drive signals, which are supplied to the coil 120 from the outside, and the first and third terminals 64-3 and 64-4 may supply or transmit the output voltage of the sensing coil 170 to the outside.

If the solder bonded to the first to fourth terminals 64-1 to 64-4 projects from the outer surface of the base 210, the contact or collision between the solder bonded to the first to fourth terminals 64-1 to 64-4 and the cover member 300 may occur, thereby causing a conductive short or disconnection. In the embodiment, since each of the depressions 52a and 52b has a sufficient depth to prevent the solder bonded to the terminals 64-1 to 64-4 from projecting from the outer surface of the base 210, it is possible to prevent the above-mentioned conductive short or disconnection.

The first to fourth terminals 64-1 to 64-4 may be provided or disposed in one region of the second outer frames 162-1 to 162-4 of the first to fourth elastic members 160-1 to 160-4, which are disposed under the first side portions 141-1 of the housing 140 and/or the corner portions 142-1 and 142-2 of the housing 140 adjacent to the first side portions 141-1.

The first bonding portion 15a of the first elastic member 160-1, to which one end of the coil 120 is coupled, may be formed at one end of the first inner frame of the first elastic member 160-1 disposed under the side portion of the bobbin 110 that corresponds to the first side portion 141-1 of the housing 140.

The second bonding portion 15b of the second elastic member 160-2, to which the other end of the coil 120 is coupled, may be formed at one end of the first inner frame 161-2 of the second elastic member 160-2, which is disposed under the side portion of the bobbin 110 that corresponds to the first side portion 141-1 of the housing 140.

The first bonding portion 16a of the third elastic member 160-3, to which one end of the sensing coil 170 is coupled, may be formed at one end of the second outer frame 163-3 of the third elastic member 160-3, which is coupled to the second corner portion 142-2 of the housing 140.

The second bonding portion 16b of the fourth elastic member 160-4, to which the other end of the sensing coil 170 is coupled, may be formed at one end of the second outer frame 163-4 of the fourth elastic member 160-4, which is coupled to the first corner portion 142-1 of the housing 140.

In the above-mentioned first to fourth terminals 64-1 to 64-4, the term "terminal" may be interchangeably used with "pad portion", "bonding portion", "solder portion" or "electrode portion".

The first and second terminals 64-1 and 64-2 of the first and second elastic members 160-1 and 160-2 may be conductively connected to the coil 120, and power signals or drive signals may be applied to the first and second terminals 64-1 and 64-2 so as to drive the coil 120.

The third and fourth terminals 64-3 and 64-4 of the third and fourth elastic members 160-3 and 160-4 may be conductively connected to the sensing coil 170 such that the induction voltage of the sensing coil 170 is output via the third and fourth terminals 64-3 and 64-4.

Although, in FIGS. 5A and 5B, the first terminal 64-1 is integrally formed with the first elastic member 160-1, the second terminal 64-2 is integrally formed with the second elastic member 160-2, the third terminal 64-3 is integrally formed with the third elastic member 160-3, and the fourth terminal 64-4 is integrally formed with the fourth elastic member 160-4, the disclosure is not limited thereto.

In another embodiment, at least one of the first to fourth terminals may be prepared separately from at least one of the first to fourth elastic members, and may be disposed on the first outer surface of the base 210, and the at least one of the first to fourth terminals may be connected to the at least one of the first to fourth elastic members via a conductive adhesive (for example, solder).

For example, each of the first to fourth terminals may be formed separately from each of the first to fourth elastic members, and may be connected to a corresponding one of the first to fourth elastic members via a conductive adhesive (for example, solder).

Next, the base 210 will be described.

The base 210 may be coupled to the housing 140, and may define a reception space for accommodating the bobbin 110 and the housing 140, in conjunction with the cover member 300. The base 210 may have a bore 21 corresponding to the bore in the bobbin 110 and/or the bore in the housing 140, and may have a shape corresponding to or coinciding with that of the cover member 300, for example, a square shape.

The base 210 may include a step 211 at the lower end of the outer surface thereof, to which an adhesive is applied when the cover member 300 is secured to the base 210 via adhesion. Here, the step 211 may guide the cover member 300, which is coupled to the upper side of the base, and may face the lower end of the side plate 302 of the cover member 300. An adhesive member and/or a sealing member may be disposed or applied between the lower end of the side plate 302 of the base 210 and the step 211 of the base 210.

The base 210 may be disposed below the bobbin 110 and the housing 140.

For example, the base 210 may be disposed below the lower elastic member 160.

The base 210 may be provided on the upper surface 210A thereof with columns 216a to 216d, which project toward the housing 140.

The base 210 may include the columns 216a to 216d, which respectively project upwards to a predetermined height from the corners or corner portions. Here, the columns 216a to 216d of the base 210 may be alternatively referred to as "projections".

For example, although the columns 216a to 216d of the base 210 may have the form of a polygonal column, which projects perpendicularly from the upper surface 210A of the base 210, the disclosure is not limited thereto.

The columns 216a to 216d of the base 210 may be fitted, fastened or coupled to the guide groove 148 in the housing 140 using an adhesive such as epoxy or silicone.

The columns 216a to 216d of the base 210 and the guide groove 148 in the housing 140 may form the above-mentioned coupling region. The coupling region may further include an adhesive member such as epoxy or silicone for coupling the columns 216a to 216d to the guide groove 148.

In order to prevent the lower surface or the lower end of the bobbin 210 from directly colliding with the upper surface of the base 210 in the event of an external impact, the base 210 may include a stopper 23 projecting from the upper surface thereof, and the stopper 23 of the base 210 may be disposed so as to correspond to the columns 216a to 216d of the base 210, without being limited thereto.

In order to avoid spatial interference between the bobbin 110 and the lower elastic member 160, the stopper 23 of the base 210 may be positioned higher than the elastic members 160-1 to 160-4 (for example, the second frame connectors 163) disposed on the base 210.

The base 210 may have a groove 247 formed in the upper surface 210A thereof, into which the protrusion-shaped second coupler 147 of the housing 140 is seated, fitted or coupled. The groove 247 may correspond to or face the second coupler 147 of the housing 140 in the optical-axis direction, and may be formed in a region of the upper surface of the base 210 that is positioned between each of the columns 216a to 216d of the base 210 and the stopper 23.

For example, the first and second depressions 52a and 52b may be formed in the outer surface 218 of the first side portion of the base 210.

For example, each of the first and second depressions 52a and 52b may have an upper opening, formed in the upper surface of the base 210, and a lower opening, formed in the lower surface of the base 210.

Figure 10:
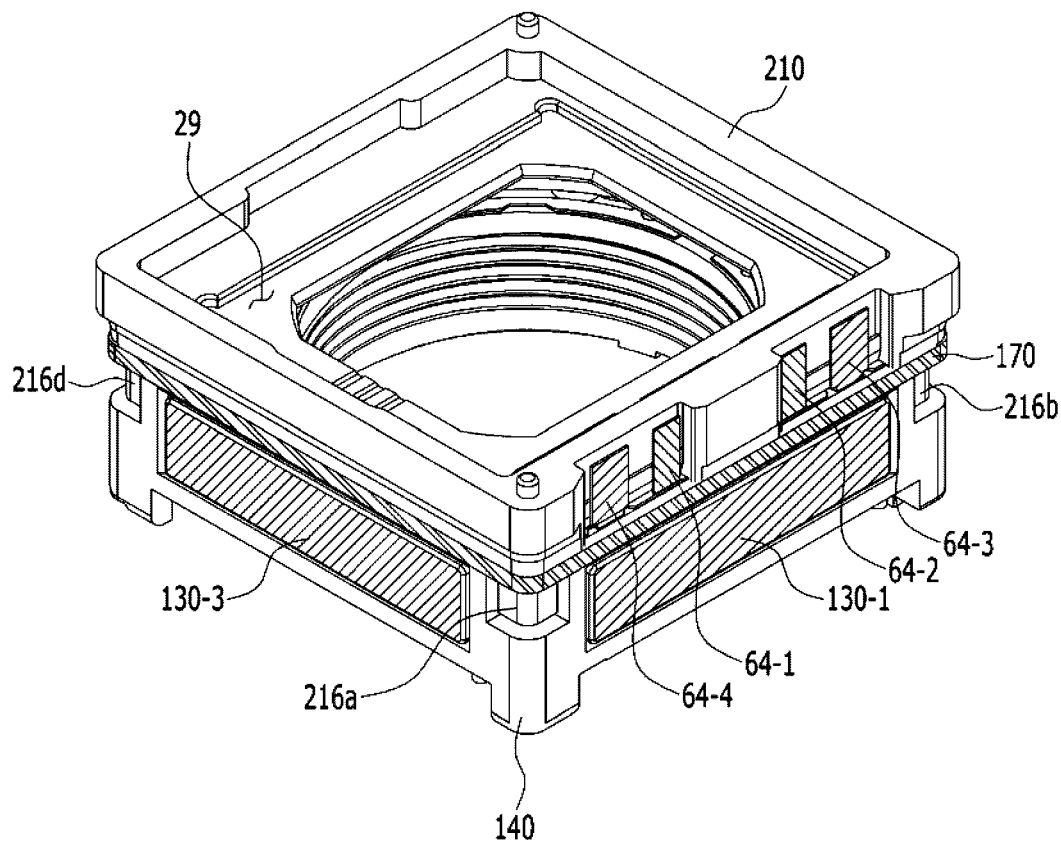
FIG. 10 is a bottom perspective view of FIG. 2.

Referring to FIG. 10, the lower surface or the lower portion of the base 210 may be provided therein with a seating groove or a groove 29 in which a filter 610 of a camera module 200 is seated.

Next, the sensing coil 170 will be described.

The sensing coil 170 may be positioned under the coil 120, and may be disposed on the housing 140.

For example, the sensing coil 170 may be positioned higher than the upper surface of the base 210. Furthermore, the sensing coil 170 may be positioned lower than the upper surface of the columns 216a to 216d of the base 210.

Figure 6:
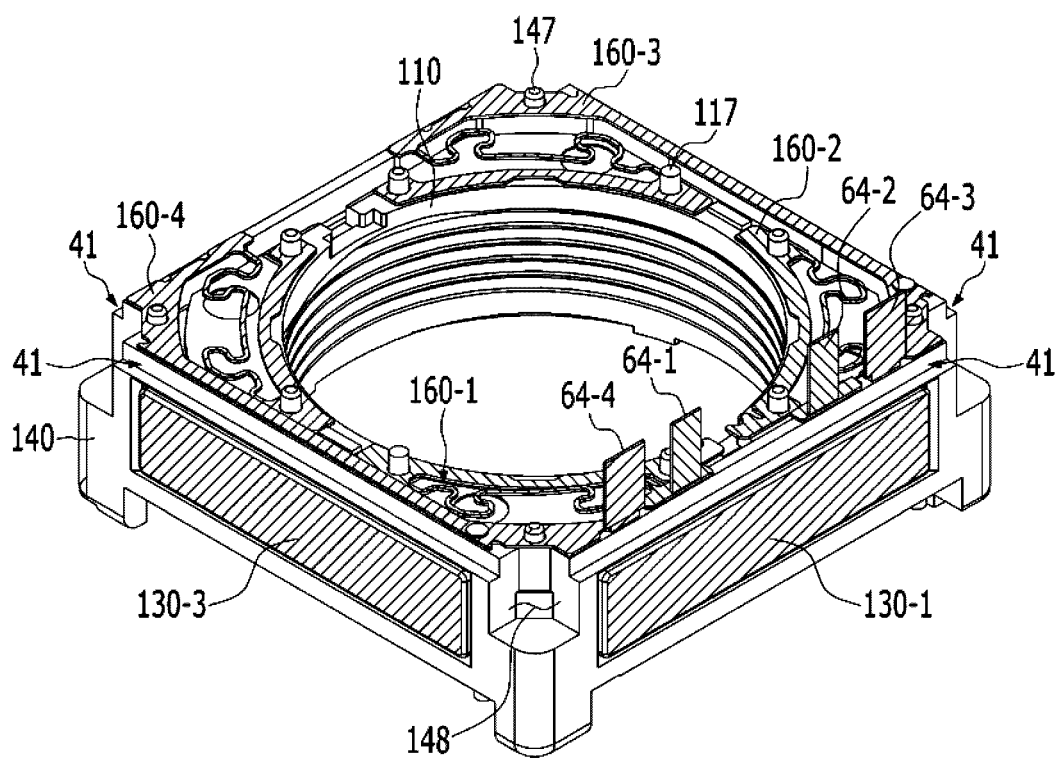
FIG. 6 is a bottom perspective view of FIG. 2, from which the base and the sensing coil are removed.
Figure 7:
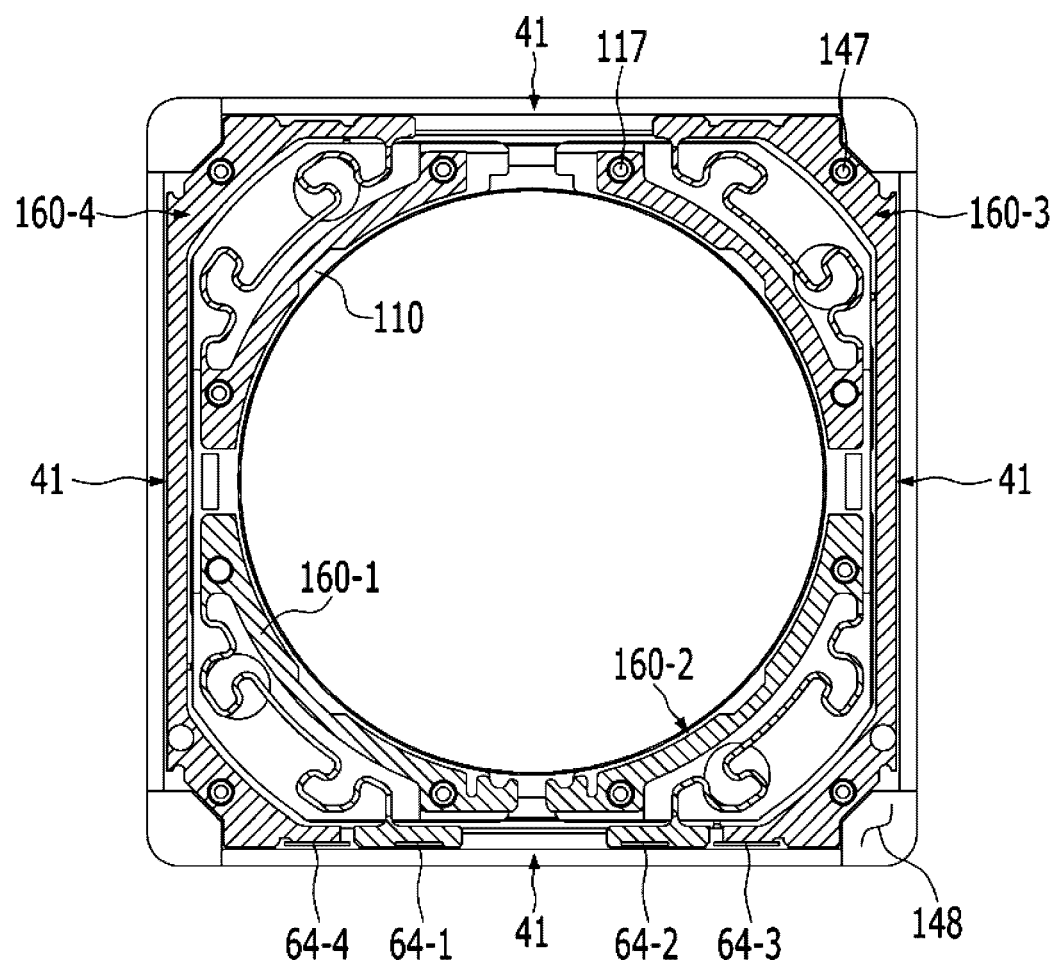
FIG. 7 is a plan view of FIG. 6.
Figure 8:
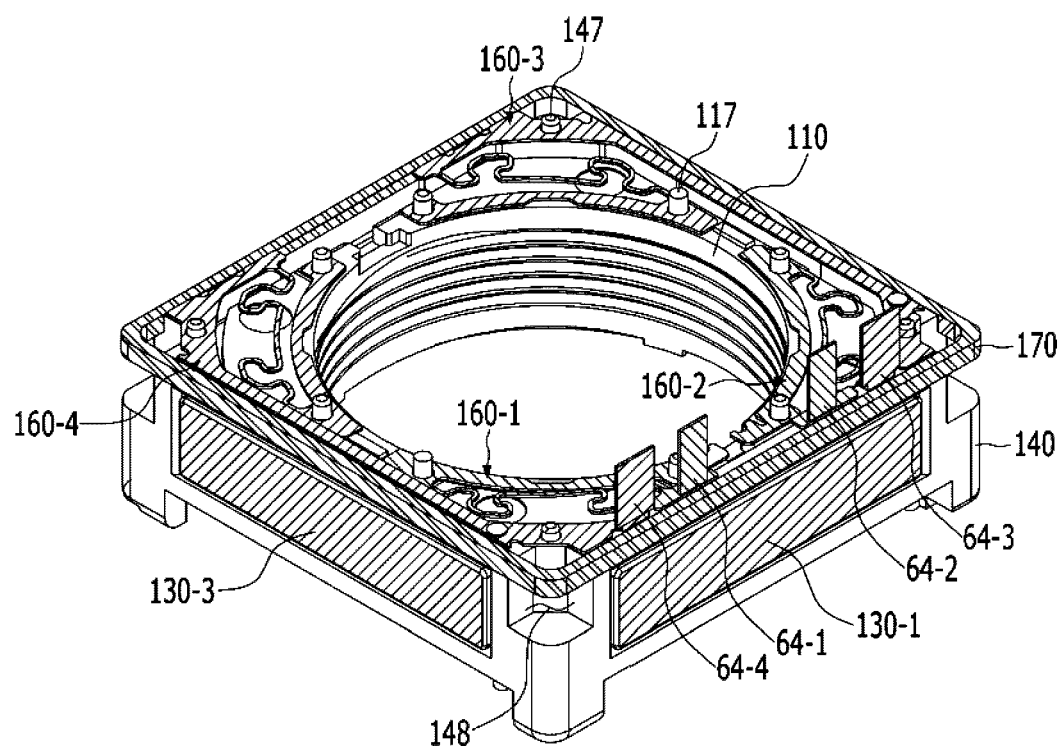
FIG. 8 is a bottom perspective view of FIG. 2, from which the base is removed.
Figure 9:
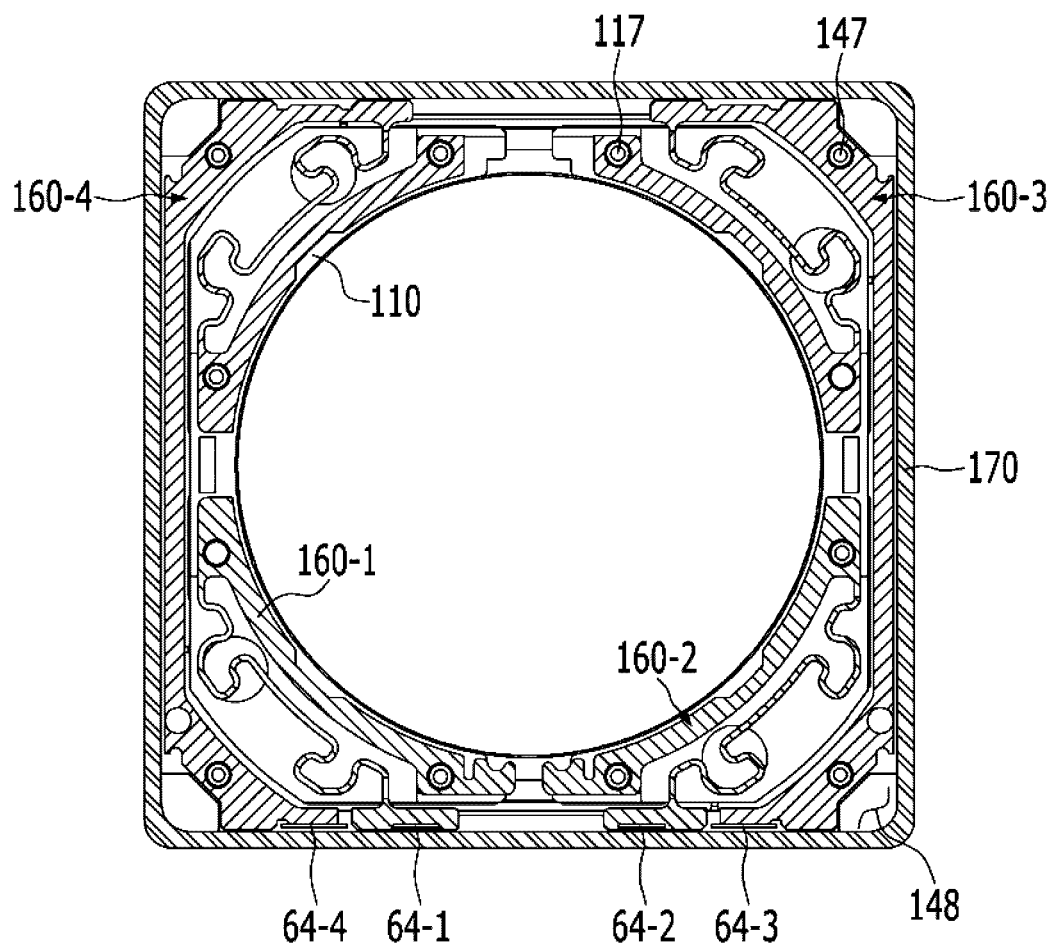
FIG. 9 is a plan view of FIG. 8.
Figure 11A:
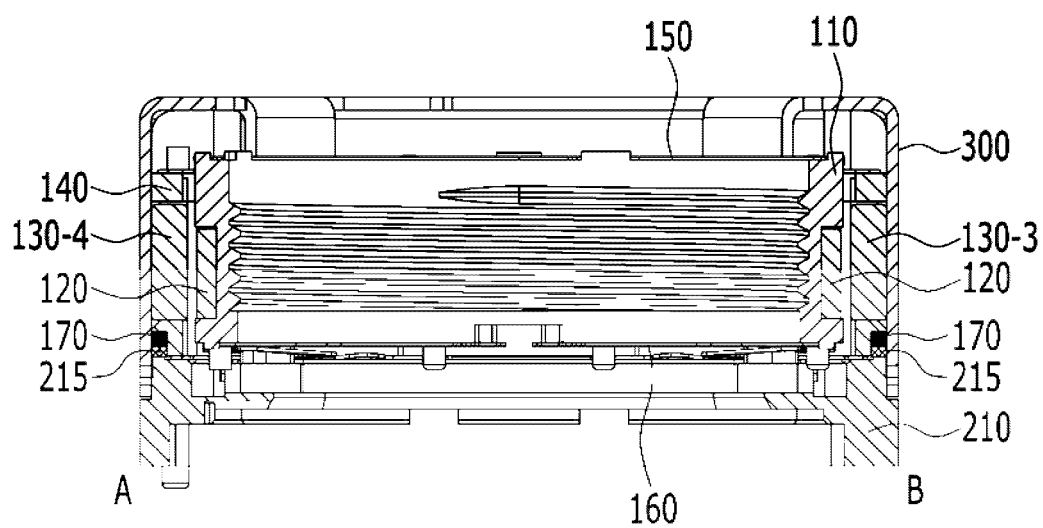
FIG. 11A is a cross-sectional view taken along line A-B in FIG. 2.
Figure 11B:
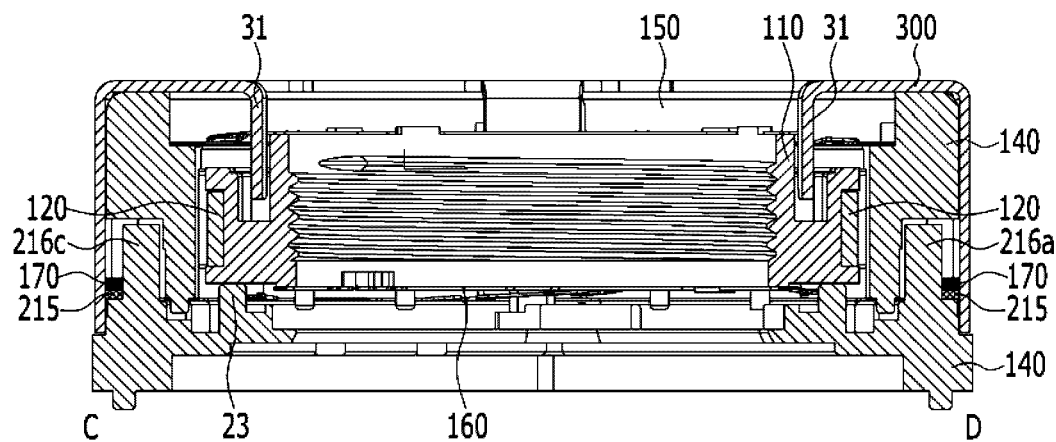
FIG. 11B is a cross-sectional view taken along line C-D in FIG. 2.

FIG. 6 is a bottom perspective view of FIG. 2, from which the base 210 and the sensing coil 170 are removed. FIG. 7 is a plan view of FIG. 6. FIG. 8 is a bottom perspective view of FIG. 2, from which the base 210 is removed. FIG. 9 is a plan view of FIG. 8. FIG. 10 is a bottom perspective view of FIG. 2. FIG. 11A is a cross-sectional view taken along line A-B in FIG. 2. FIG. 11B is a cross-sectional view taken along line C-D in FIG. 2.

The sensing coil 170, which is intended to detect displacement of the AF operation unit, may output the induction voltage resulting from mutual inductive action with the coil 120.

Referring to FIGS. 6 to 11B, the sensing coil 170 may be disposed under the magnet 130, which is disposed under the housing 140.

For example, the sensing coil 170 may overlap the magnet 130 in the optical-axis direction.

For example, the sensing coil 170 may be disposed lower than the upper elastic member 150 with respect to the upper surface of the base 210. In other words, the sensing coil 170 may be positioned closer to the upper surface of the base 210 than is the upper elastic member 150.

For example, the sensing coil 170 may be disposed lower than the coil 120 with respect to the upper surface of the base 210. In other words, the sensing coil 170 may be positioned closer to the upper surface of the base 210 than is the coil 120.

For example, although the sensing coil 170 may not overlap the coil 120 in the optical-axis direction, the disclosure is not limited thereto. In another embodiment, the sensing coil 170 may include a portion that overlaps the coil 120 in the optical-axis direction.

Although the sensing coil 170 is disposed outside the first to fourth terminals 64-1 to 64-4 of the first to fourth elastic members 160-1 to 160-4, the disclosure is not limited thereto. In another embodiment, the sensing coil 170 may be positioned inside the first to fourth terminals 64-1 to 64-4, or may be disposed so as to overlap the first to fourth terminals 64-1 to 64-4 in the optical-axis direction.

For example, the sensing coil 170 may be disposed or positioned above the first to fourth terminals 64-1 to 64-4 of the first to fourth elastic members 160-1 to 160-4.

For example, the sensing coil 170 may be disposed outside the columns 216a to 216d of the base 210. Consequently, it is possible to increase the length of the sensing coil 170 and to reduce the number of turns of the sensing coil 170 (that is, the number of times the sensing coil 170 is wound) for realizing a predetermined resistance value. Furthermore, since the number of turns of the sensing coil 170 (or the number of times the sensing coil 170 is wound) is reduced, the region of the housing 140 that is required to dispose the sensing coil 170 is reduced whereas the region of the housing 140 that is required to dispose the magnet 130 is increased. Accordingly, since the size of the magnet that can be mounted to the housing 140 is increased, it is possible to increase the electromagnetic force for AF operation.

Furthermore, the resistance value of the sensing coil 170 is affected by variation in the temperature of the lens moving apparatus. Due to the variation in the resistance value of the sensing coil 170, the output (for example, the sensing current or the induction voltage) of the sensing coil 170 may vary. Because the influence of variation in temperature on the output of the sensing coil 170 may cause malfunction of AF operation, there is a need for temperature compensation. The temperature compensation may be easily realized by increasing the resistance of the sensing coil 170 to a predetermined resistance value (for example, 30Ω) or more. The embodiment is capable of realizing a resistance value of the sensing coil 170 sufficient to easily perform temperature compensation using a small number of turns.

For example, the sensing coil 170 may be in contact with the outer surface of the columns 216a to 216d of the base 210. The sensing coil 170 may overlap the columns 216a to 216d of the base 210 in a direction perpendicular to the optical axis.

For example, the base 210 may include a projection 215 projecting from the edge of the upper surface of the base 210. The upper surface of the projection 215 of the base 210 may be lower than the upper surfaces of the columns 216a to 216d. For example, the projection 215 of the base 210 may be disposed or formed outside the columns 216a to 216d of the base 210.

For example, the sensing coil 170 may be disposed between the projection 215 of the base 210 and the seating groove 41 in the housing 140.

The sensing coil 170 may include a portion that is disposed outside the coupling region between the corner portions of the housing 140 and the corners of the base 210. For example, the corner portions of the sensing coil 170 may be disposed outside the coupling region between the corner portions of the housing 140 and the corners of the base 210.

For example, the columns 216a to 216d of the base 210 and the first to fourth elastic members 160-1 to 160-4 may be positioned inside the sensing coil 170.

Here, the inside of the sensing coil 170 may be the side at which the center of the base 210 is positioned with respect to the sensing coil 170, and the outside of the sensing coil 170 may be the side opposite the side at which the center of the base 210 is positioned with respect to the sensing coil 170.

The sensing coil 170 may include a portion that is in contact with the outer surface of the coupling region and overlaps the coupling region in a direction perpendicular to the optical axis.

For example, the sensing coil 170 may include a portion that is in contact with the outer surfaces of the columns 216a to 216d and overlaps the columns in a direction perpendicular to the optical axis.

The sensing coil 170 may generate an induction voltage resulting from mutual induction with the coil 120 to which a drive signal is supplied.

The sensing coil 170 may be disposed so as to surround the lower portion of the outer surface of the housing 140.

The sensing coil 170 may have a closed curve shape, for example a ring shape, which surrounds the lower portions of the outer surfaces of the side portions 141-1 to 141-4 of the housing 140. For example, the sensing coil 170 may have the form of a ring wound clockwise or counterclockwise around the optical axis OA.

For example, the coil 120 may include a ring portion having a circular shape, an elliptical shape, or a polygonal shape (for example, a quadrangular shape, a pentagonal shape, an octagonal shape, or the like). For example, the sensing coil 170 may include a ring portion having a circular shape, an elliptical shape or a polygonal shape (for example, a quadrangular shape, a pentagonal shape, an octagonal shape or the like).

For example, although the ring portion of the sensing coil 170 may not overlap the ring portion of the coil 120 in the optical-axis direction, the disclosure is not limited thereto. In another embodiment, the ring portion of the sensing coil 170 may overlap the ring portion of the coil 120.

Although at least a portion of the ring portion of the sensing coil 170 may overlap the magnets 130-1 to 130-4 in the optical-axis direction, the disclosure is not limited thereto. In another embodiment, the ring portion and the magnets may not overlap each other in the optical-axis direction.

The diameter of the ring portion of the sensing coil 170 may be larger the diameter of the ring portion of the coil 120. For example, the outside diameter of the ring portion of the sensing coil 170 may be larger than the outside diameter of the bobbin 110, and may be larger than the outside diameter of the ring portion of the coil 120. Here, the outside diameter of the ring portion may be the external diameter of the ring portion.

In order to increase AF driving force, the length of the coil 120 in the optical-axis direction may be greater than the length of the sensing coil 170 in the optical-axis direction. In another embodiment, the length of the coil 120 in the optical-axis direction may be equal to or less than the length of the first sensing coil 170 in the optical-axis direction.

The sensing coil 170 may be an induction coil for detecting the position or displacement of the AF operation unit, for example, the bobbin 110. Although the sensing coil 170 may be embodied as a wire, the disclosure is not limited thereto. In another embodiment, each of the first sensing coil 170A and the second sensing coil 170B may be embodied as an FPCB-type coil or an FP (fine pattern)-type coil.

For example, when the AF operation unit is moved by the interaction between the coil 120, to which a drive signal is applied, and the magnet 130, induction voltage may be generated by the interaction between the coil 120 and the sensing coil 170.

The magnitude of the induction voltage may be determined based on displacement of the AF operation unit, and the induction voltage of the sensing coil 170 may be output via the third and fourth terminals 64-3 and 64-4 of the third and fourth elastic members 160-3 and 160-4.

A controller 780 of a camera module 200 or a controller 780 of an optical device 200A may detect displacement of the AF operation unit using the induction voltage supplied via the third and fourth terminals 64-3 and 64-4 of the lens moving apparatus 100, and may perform an AF feedback operation using the detected displacement of the AF operation unit to thus perform an accurate AF operation.

Generally, because there are necessities for a position sensor (for example, a Hall sensor) capable of detecting the displacement of the AF operation unit, for example, the bobbin, and an additional structure configured to allow power for driving the position sensor to be supplied to the position sensor in order to perform AF feedback control, the cost of the lens moving apparatus may increase and the manufacture of the lens moving apparatus may be made difficult.

The linear zone (hereinafter, referred to as a "first linear zone") in a graph plotted between the moving distance of the bobbin and the magnetic flux of the magnet detected by the position sensor may be restricted by the positional relationship between the magnet and the position sensor.

Since the embodiment does not require an additional position sensor for detecting displacement of the bobbin 110, it is possible to reduce the cost of the lens moving apparatus by reducing the number of components, to facilitate the manufacturing process, and to realize a miniaturized lens moving apparatus having a large bore.

Furthermore, since the embodiment is not provided with a Hall sensor and with a sensing magnet corresponding to the Hall sensor, there is no magnetic-field interference between a sensing magnet and a driving magnet, thereby improving characteristics with regard to tilt and resolution of the lens moving apparatus. In addition, in the case in which two or more camera modules are included, there is no magnetic-field interference between adjacent camera modules attributable to a sensing magnet.

Furthermore, since the induction voltage resulting from mutual induction between the coil 120 and the sensing coil 170 is used, the linear zone in a graph of the induction voltages of the sensing coil 170 over the displacement of the bobbin 110 may be longer than the first linear zone. Consequently, the embodiment is able to ensure linearity over a wide range, reduce a defective fraction, and perform more accurate AF feedback control.

Furthermore, since the first to fourth terminals 64-1 to 64-4 of the first to fourth elastic members 160-1 to 160-4 are disposed on only one outer surface of the base 210, it is possible to reduce the amount of solder and thus to improve convenience in soldering.

For example, the first and second terminals 64-1 and 64-2 may be disposed between the third and fourth terminals 64-3 and 64-4. In another embodiment, the third and fourth terminals may be disposed between the first and second terminals. In a further embodiment, the first to fourth terminals may be disposed in any of various arrangements depending on the design of the elastic members.

For example, although the first to fourth terminals 64-1 to 64-4 may not project downwards from the lower surface of the base 210, the disclosure is not limited thereto.

For example, in another embodiment, a portion of at least one of the first to fourth terminals 64-1 to 64-4 may be exposed or projected downwards from the lower surface of the base 210. Here, the portion of at least one of the first to fourth terminals that projects downwards from the lower surface of the base 210 may be coupled to terminals of a circuit board 800 via solder.

Figure 11C:
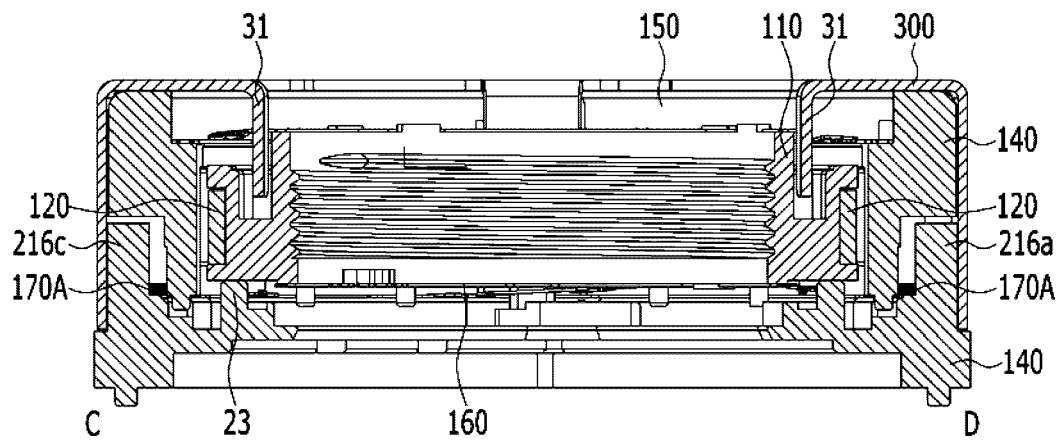
FIG. 11C is a cross-sectional view of another embodiment taken along line C-D in FIG. 2.

FIG. 11C is a cross-sectional view of another embodiment taken along line C-D in FIG. 2.

Referring to FIG. 11C, a sensing coil 170A may include a portion that is disposed inside the coupling region between the housing 140 and the base 210.

For example, the sensing coil 170A may include a portion that is disposed inside the columns 216*a* to 216*d* of the base 210. For example, the corners of the sensing coil 170A may be disposed inside the columns 216*a* to 216*d*.

For example, the corners or the corner portions of the sensing coil 170A may be disposed in the grooves 148 in the housing 140.

For example, the corners or the corner portions of the sensing coil 170A may be disposed between the corner portions of the housing 140 and the columns of the base 210. For example, although the sensing coil 170A may be configured to have an octagonal shape, the disclosure is not limited thereto.

The sensing coil 170A may be in contact with the inner surfaces of the coupling regions between the corner portions of the housing 140 and the corners of the base 210, and may overlap the coupling region in a direction perpendicular to the optical axis.

For example, the sensing coil 170A may be in contact with the inner surfaces of the columns 216*a* to 216*d* of the base 210. The sensing coil 170A may overlap the columns 216*a* to 216*d* of the base 210 in a direction perpendicular to the optical axis.

The embodiment shown in FIG. 11C is capable of preventing damage to the sensing coil 170A caused by collision of the corner portions of the sensing coil 170A with the cover member 300.

Figure 12:
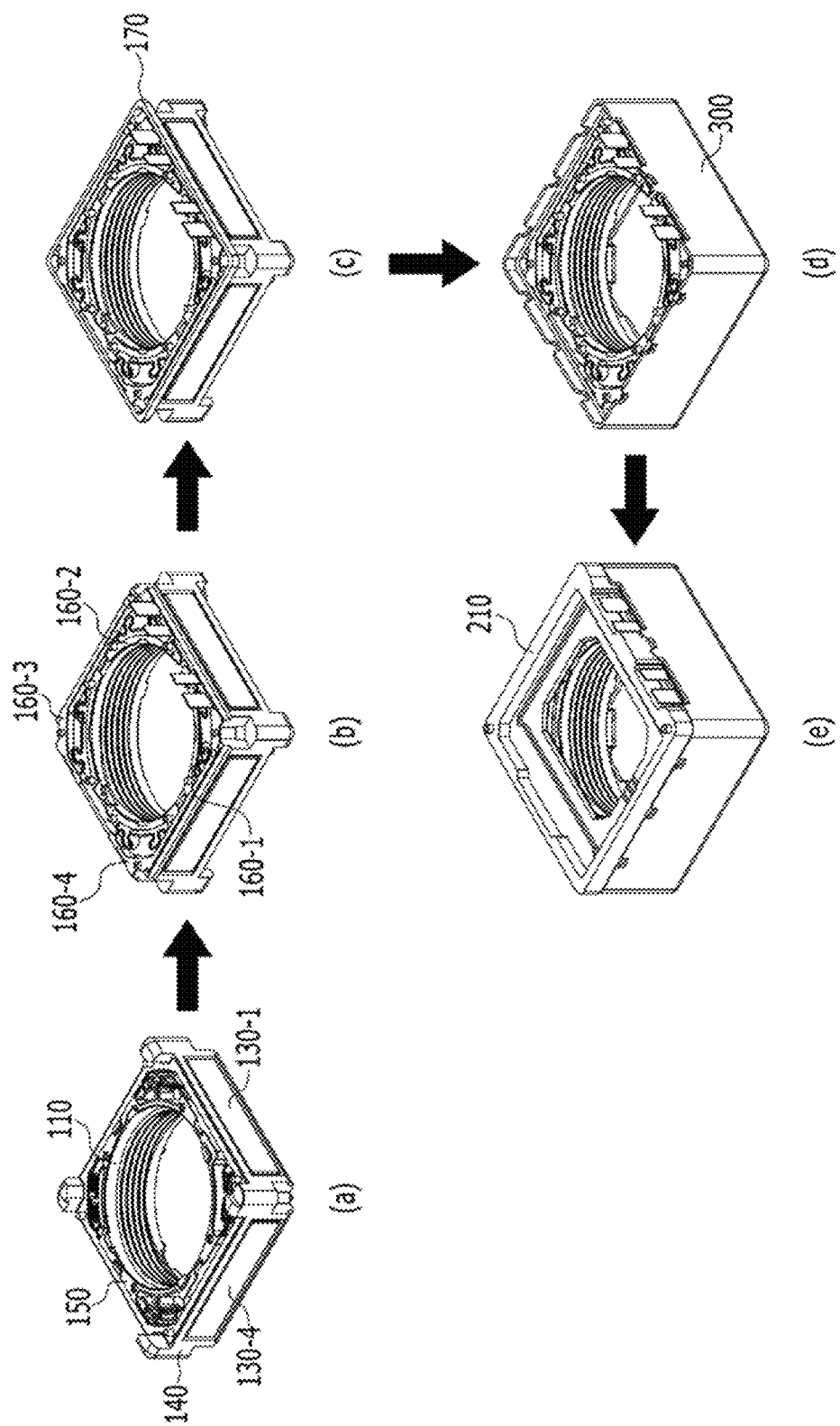
FIG. 12 illustrates the assembly sequence of the lens moving apparatus shown in FIG. 1.

FIG. 12 illustrates the assembly sequence of the lens moving apparatus 100 shown in FIG. 1.

In operation (a) in FIG. 12, the bobbin 110, to which the coil 120 is mounted, is mounted to the housing 140, and then the upper elastic member 150 is coupled to the first coupler 113 of the bobbin 110 and the first coupler 144 of the housing 140 via heat fusion and/or an adhesive.

Subsequently, in operation (b) in FIG. 12, the assembly, which has been subjected to the operation (a), is rotated 1800 degrees, and the lower elastic member 160 is coupled to the second coupler 117 of the bobbin 110 and the second coupler 147 of the housing 140 via heat fusion and/or an adhesive.

Subsequently, in operation (c) in FIG. 12, the sensing coil 170 is disposed or mounted in the seating groove 41 in the housing 140. For example, the sensing coil 170 may be formed in such a way as to directly wind a coil in the seating groove 41 or to bond a coil block to the seating groove 41 using an adhesive.

Subsequently, the coil 120 is coupled to the first and second bonding portions 64-1 and 64-2 of the first and second elastic members 160-1 and 160-2 using a conductive adhesive or solder, and the sensing coil 120 is coupled to the first and second bonding portions 64-3 and 64-4 of the third and fourth elastic members 160-3 and 160-4.

Subsequently, in operation (d) in FIG. 12, the cover member 300 is assembled with the assembly, which has been subjected to the operation (c), in an upward direction from beneath.

Subsequently, in operation (e) in FIG. 12, the base 210 is assembled with the assembly, which has been subjected to the operation (d), in a downward direction from above.

Because the coil 120 and the sensing coil 170 are coupled to the first to fourth elastic members through one bonding process in the operation (c), it is possible to facilitate processing.

In contrast, in a structure in which the sensing coil is coupled to the outer surface of the base, because an AF coil mounted on a bobbin is first coupled to first and second elastic members through first soldering and then a sensing coil coupled to a base is coupled to third and fourth elastic members through second soldering, the bonding process is complicated and is not easy.

The lens moving apparatus according to the embodiment may be applied to various fields, for example, those of camera modules or optical devices.

For example, the lens moving apparatus 100 according to the embodiment may be included in an optical instrument, which is designed to form the image of an object in a space using reflection, refraction, absorption, interference, diffraction or the like, which are characteristics of light, to extend eyesight, to record an image obtained through a lens or to reproduce the image, to perform optical measurement, or to propagate or transmit an image. For example, although the optical instrument according to the embodiment may be a mobile phone, cellular phone, smart phone, portable smart instrument, digital camera, laptop computer, digital broadcasting terminal, PDA (Personal Digital Assistant), PMP (Portable Multimedia Player), navigation device, or the like, the disclosure is not limited thereto. Furthermore, any device capable of taking images or photographs is possible.

Figure 13:
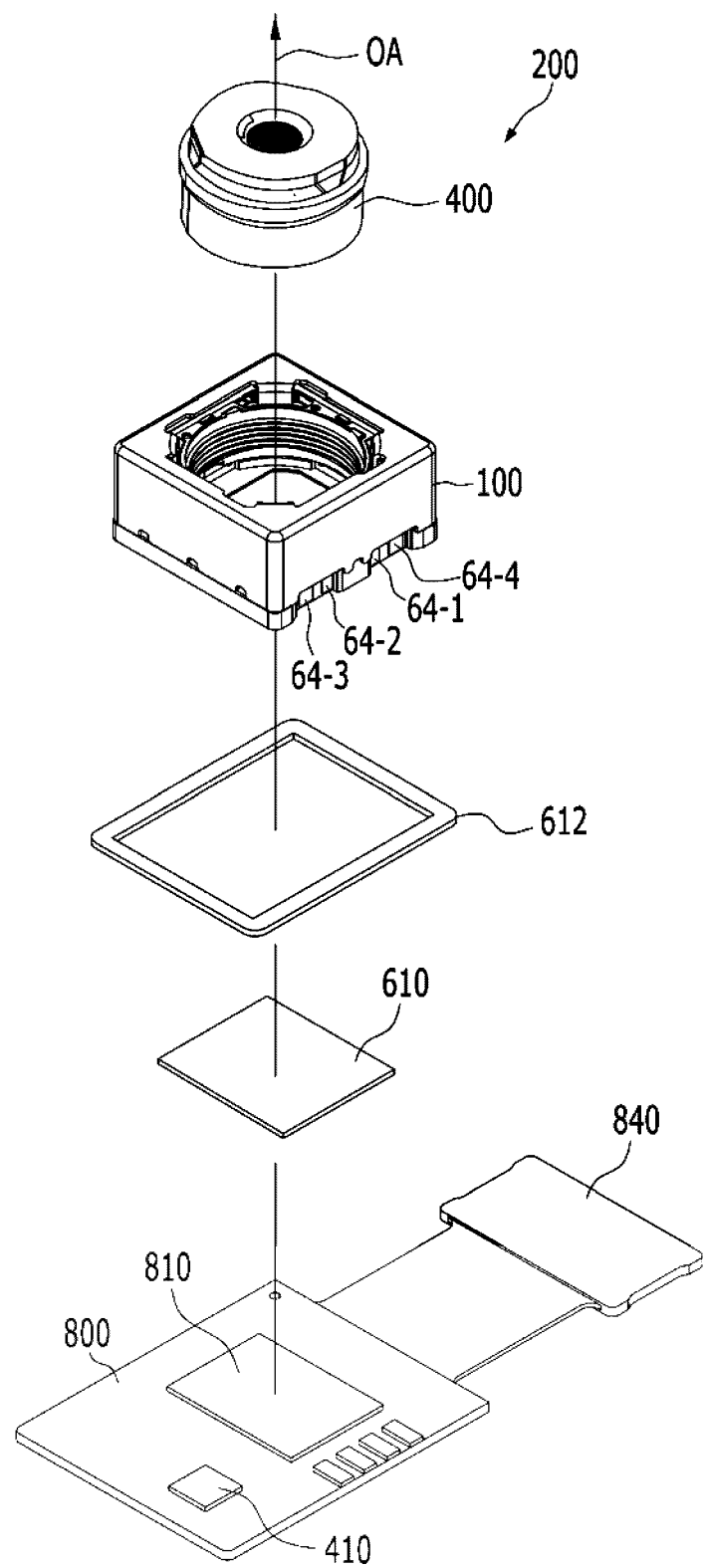
FIG. 13 is an exploded perspective view illustrating a camera module according to an embodiment.

FIG. 13 is an exploded perspective view illustrating a camera module 200 according to an embodiment.

Referring to FIG. 13, the camera module may include a lens or a lens module 400, the lens moving apparatus 100, an adhesive member 612, a filter 610, a circuit board 800, an image sensor 810, and a connector 840.

The lens module 400 may include a lens or a lens barrel, and may be mounted or coupled to the bobbin 110 of the lens moving apparatus 100.

For example, the lens module 400 may include one or more lenses and a lens barrel configured to accommodate the lenses. However, one component of the lens module is not limited to the lens barrel, and any component may be used, as long as it has a holder structure capable of supporting one or more lenses. The lens module 400 may be coupled to the lens moving apparatus 100 and may be moved therewith.

For example, the lens module 400 may be coupled to the lens moving apparatus 100 through threaded engagement. For example, the lens module 400 may be coupled to the lens moving apparatus 100 by means of an adhesive (not shown). The light that has passed through the lens module 400 may be radiated to the image sensor 810 through the filter 610.

The adhesive member 612 may couple or attach the base 210 of the lens moving apparatus 100 to the circuit board 800. The adhesive member 612 may be, for example, epoxy, thermohardening adhesive, or ultraviolet hardening adhesive.

The filter 610 may serve to prevent light within a specific frequency band that passes through the lens barrel 400 from being introduced into the image sensor 810. The filter 610 may be, for example, an infrared-light-blocking filter, without being limited thereto. Here, the filter 610 may be oriented parallel to the X-Y plane.

Here, the infrared-light-blocking filter may be made of a film material or a glass material. For example, the infrared-light-blocking filter may be manufactured by applying an infrared-light-blocking coating material to a plate-shaped optical filter such as a cover glass for protecting an imaging area.

The filter 610 may be disposed below the base 210 of the lens moving apparatus 100.

For example, the base 210 of the lens moving apparatus 100 may be provided on the lower surface thereof with a seating groove 29 in which the filter 610 is seated. In another embodiment, an additional sensor base, on which the filter 610 is mounted, may be provided.

The circuit board 800 may be disposed below the lens moving apparatus 100, and the image sensor 810 may be mounted on the circuit board 800. The image sensor 810 may receive an image included in the light introduced through the lens moving apparatus 100, and may convert the received image into an electrical signal.

The image sensor 810 may be positioned such that the optical axis thereof is aligned with the optical axis of the lens module 400. Accordingly, the image sensor may obtain the light that has passed through the lens module 400. The image sensor 810 may output the radiated light as an image.

The circuit board 800 may be conductively connected to the coil 120 and the sensing coil 170 of the lens moving apparatus 100.

For example, the circuit board 800 may include terminals, which are conductively connected to the first to fourth terminals 64-1 to 64-4 of the lens moving apparatus 100.

Although the circuit board 800 is illustrated as including four terminals in FIG. 13, the disclosure is not limited thereto. The circuit board 800 may include a plurality of terminals, for example, two or more terminals for controlling the camera module.

The filter 610 and the image sensor 810 may be disposed so as to be spaced apart from each other in the state of facing each other in the first direction.

The connector 840 may be conductively connected to the circuit board 800, and may have a port that is intended to be conductively connected to an external device. The camera module 200 may further include a motion sensor configured to output information on rotational angular velocity caused by movement of the camera module 200.

Figure 14:
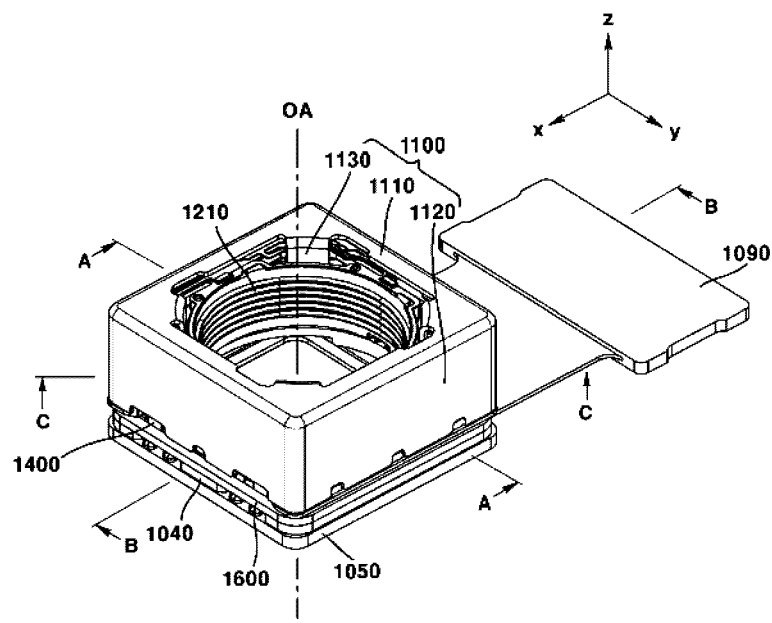
FIG. 14 is a perspective view of a camera module according to another embodiment.
Figure 15:
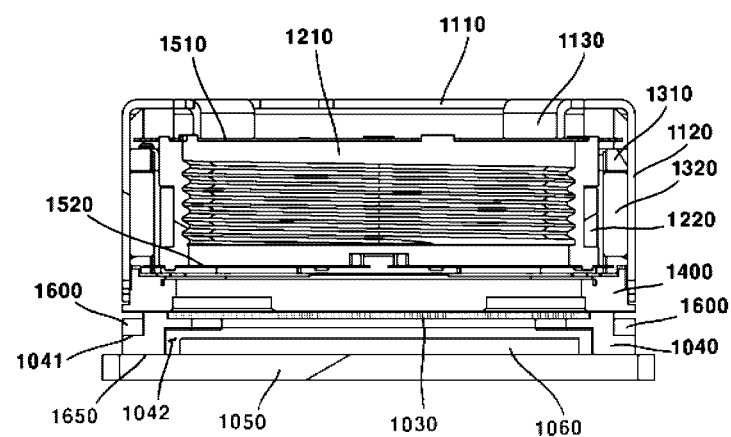
FIG. 15 is a cross-sectional view taken along line A-A in FIG. 14.
Figure 16:
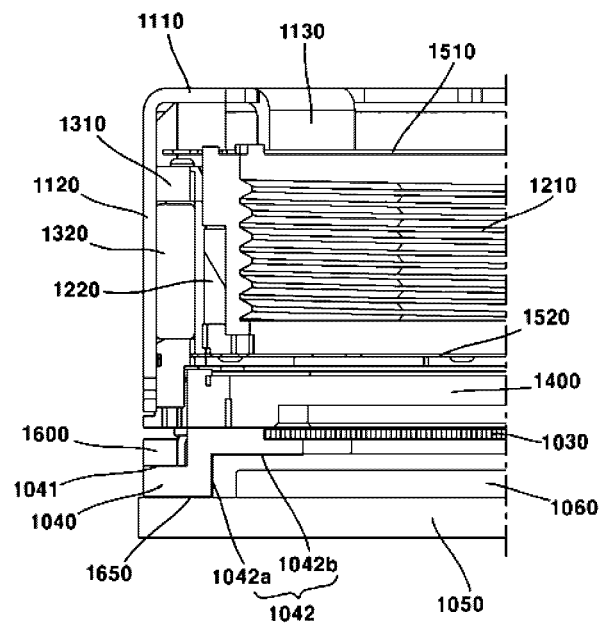
FIG. 16 is a fragmentary enlarged view of FIG. 15.
Figure 17:
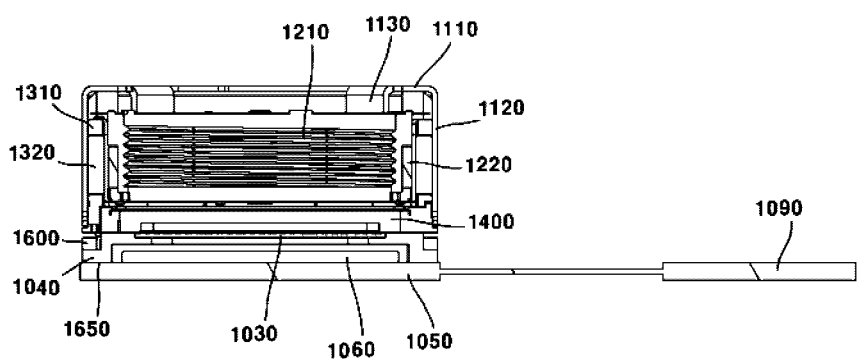
FIG. 17 is a cross-sectional view taken along line B-B in FIG. 14.
Figure 18:
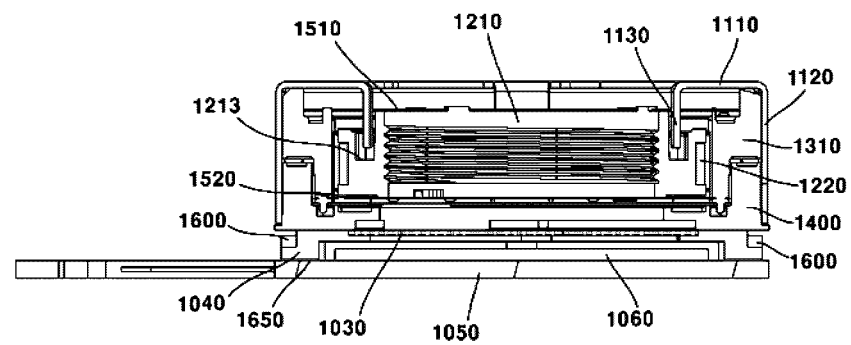
FIG. 18 is a cross-sectional view taken along line C-C in FIG. 14.
Figure 19:
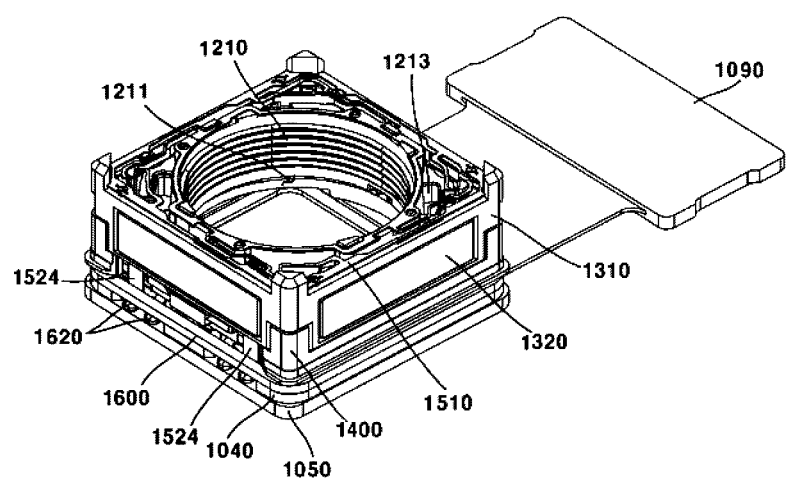
FIG. 19 is a perspective view of FIG. 14, from which a cover is removed.
Figure 20:
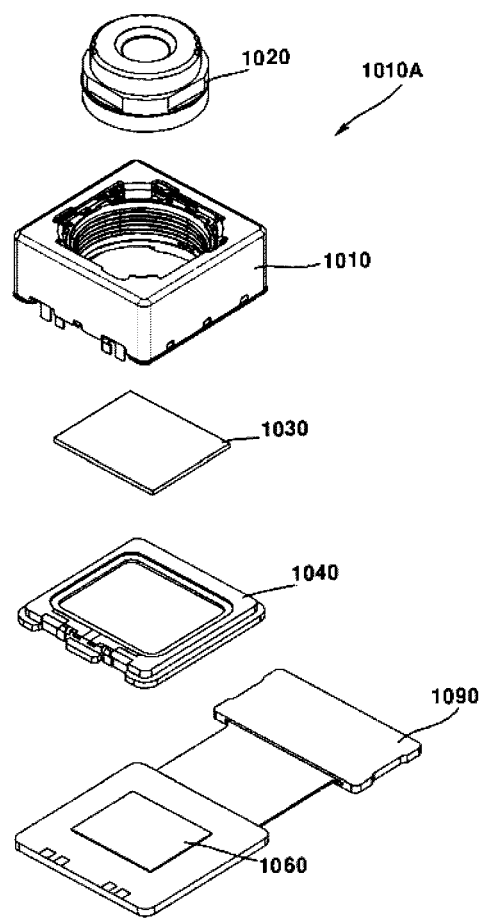
FIGS. 20 and 21 are exploded perspective views of a camera module according to an embodiment.
Figure 21:
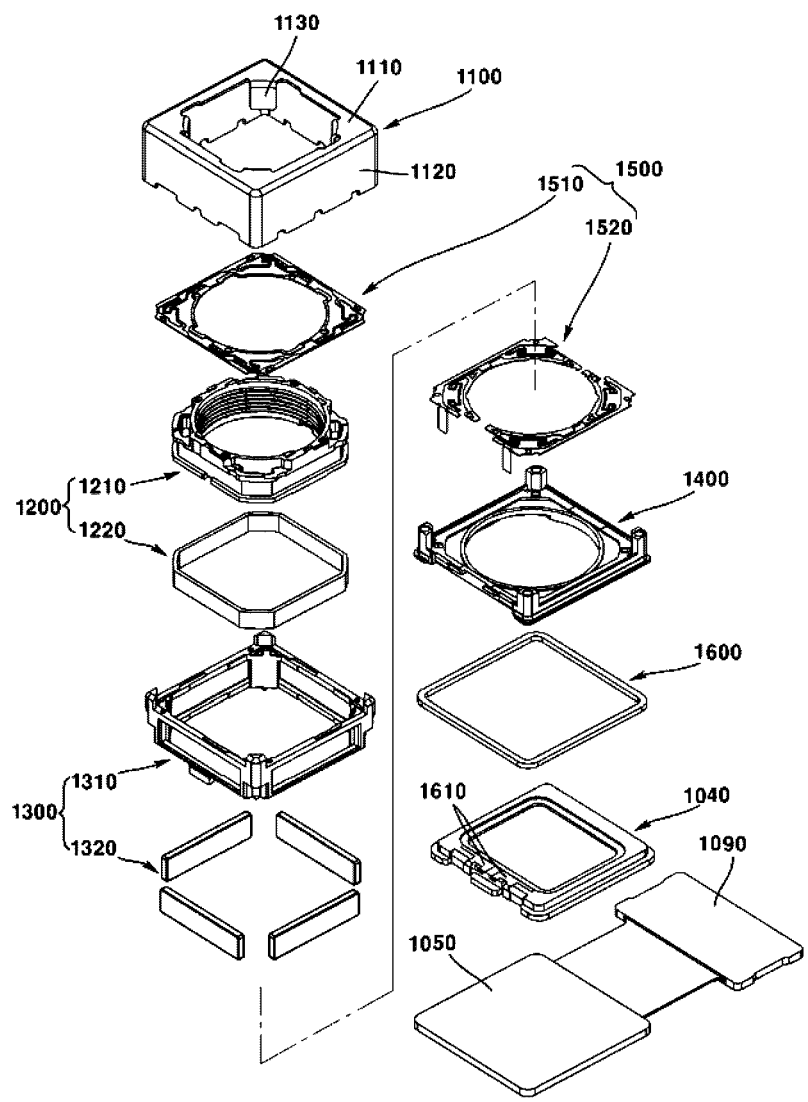
Figure 22:
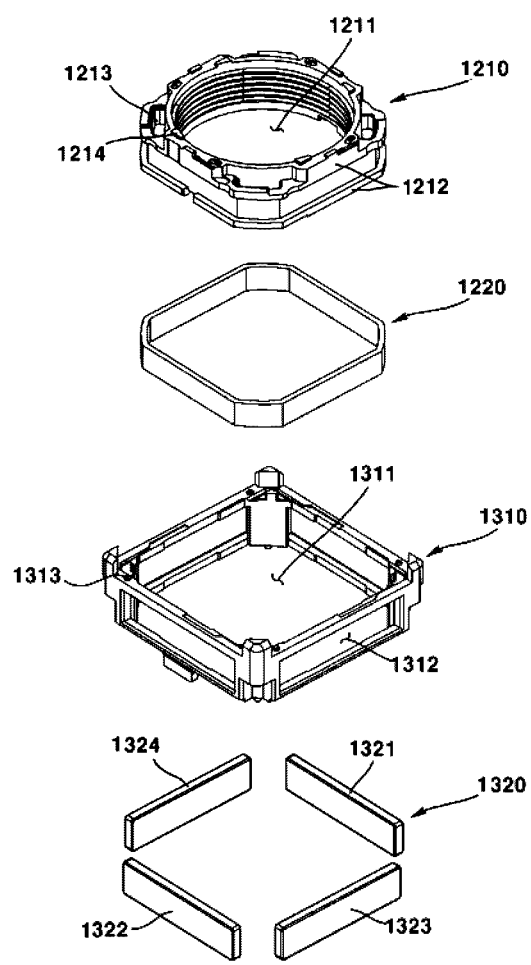
FIG. 22 is an exploded perspective view of a movable unit and a stationary unit of the camera module according to the embodiment.
Figure 23:
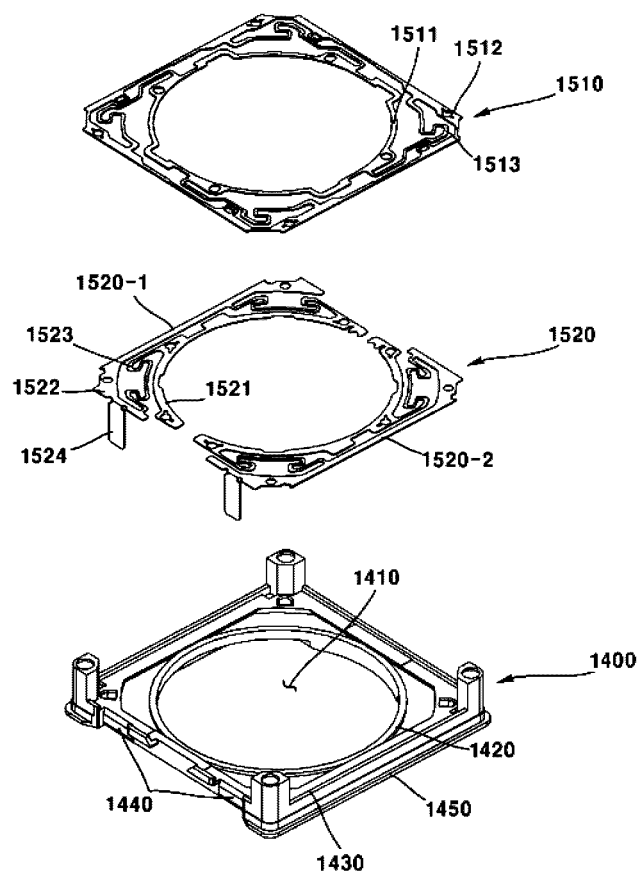
FIG. 23 is an exploded perspective view of an elastic member and a base of the camera module according to the embodiment.
Figure 24:
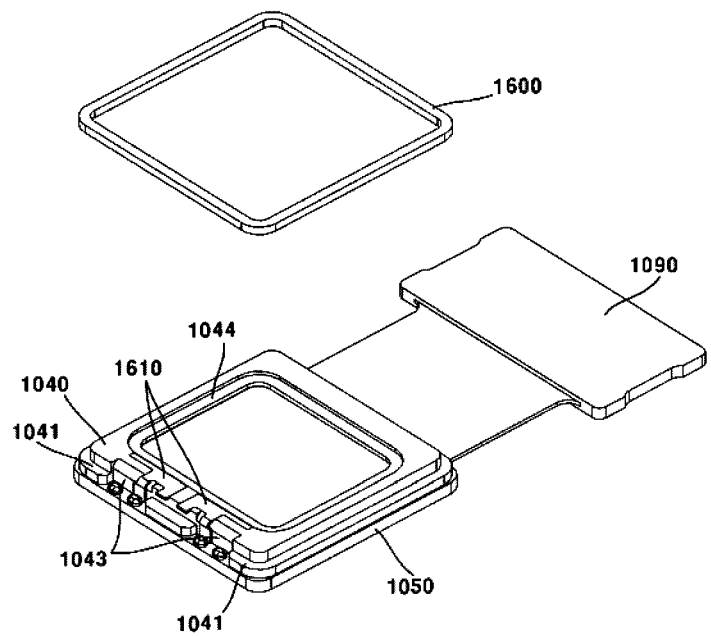
FIGS. 24 and 25 are exploded perspective views of a sensing coil, a sensor holder and components associated therewith of the camera module according to the embodiment.
Figure 25:
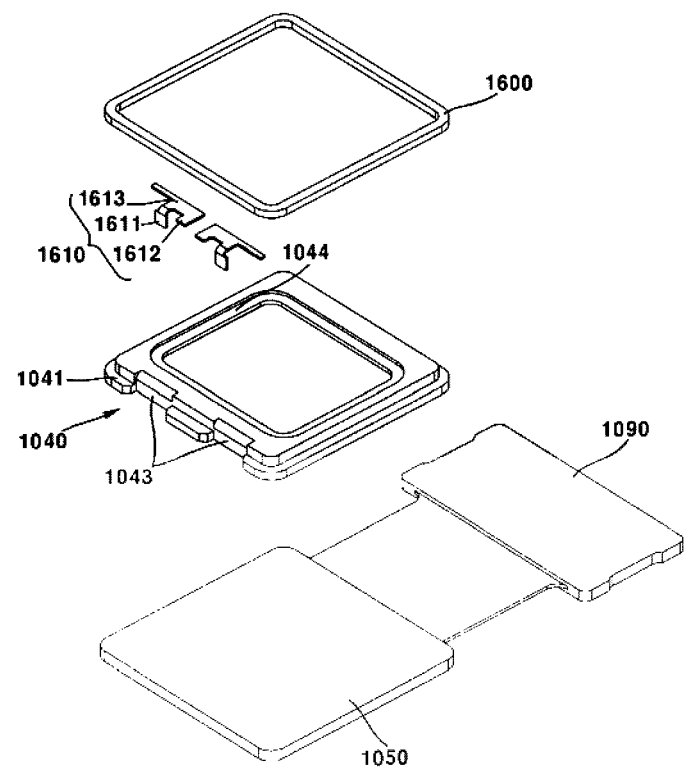

FIG. 14 is a perspective view of a camera module according to another embodiment. FIG. 15 is a cross-sectional view taken along line A-A in FIG. 14. FIG. 16 is a fragmentary enlarged view of FIG. 15. FIG. 17 is a cross-sectional view taken along line B-B in FIG. 14. FIG. 18 is a cross-sectional view taken along line C-C in FIG. 14. FIG. 19 is a perspective view of FIG. 14, from which the cover is removed. FIGS. 20 and 21 are exploded perspective views of a camera module according to an embodiment. FIG. 22 is an exploded perspective view of a movable unit and a stationary unit of the camera module according to the embodiment. FIG. 23 is an exploded perspective view of an elastic member and a base of the camera module according to the embodiment. FIGS. 24 and 25 are exploded perspective views of a sensing coil, a sensor holder, and components associated therewith of the camera module according to the embodiment.

The camera module 1010A may include a camera device.

The camera module 1010A may include a lens module 1020. The lens module 1020 may include at least one lens. The lens may be disposed on a position corresponding to an image sensor 1060. The lens module 1020 may include a lens and a barrel. The lens module 1020 may be coupled to the bobbin 1210 of the lens moving apparatus 1010. The lens module 1020 may be coupled to the bobbin 1210 via threaded engagement and/or an adhesive. The lens module 1020 may be moved together with the bobbin 1210.

The camera module 1010A may include a filter 1030. The filter 1030 may serve to prevent light within a specific frequency band that passes through the lens module 1020 from being incident on the image sensor 1060. The filter 1030 may be oriented parallel to the x-y plane. The filter 1030 may be disposed between the lens module 1020 and the image sensor 1060. The filter 1030 may be disposed on the sensor holder 1040. In a modification, the filter 1030 may be disposed on the base 1400. The filter 1030 may include an infrared filter. The infrared filter may prevent light within the infrared range from being incident on the image sensor 1060.

The camera module 1010A may include the sensor holder 1040. The sensor holder 1040 may be disposed between the lens moving apparatus 1010 and the printed circuit board 1050. The sensor holder 1040 may be disposed between the printed circuit board 1050 and the base 1400. The portion of the sensor holder 1040 at which the filter 1030 is disposed may be provided therethrough with a bore so as to allow the light that passes through the filter 1030 to be introduced into the image sensor 1060. In a modification, the sensor holder 1040 may be integrally formed with the base 1400. In this case, the sensor holder 1040 may be considered to be one component of the lens moving apparatus 1010. In the case in which the sensor holder 1040 is integrally formed with the base 1400, the second coil 1600 may be disposed on the combined structure in which the sensor holder 1040 and the base 1400 are integrally formed. The second coil 1600 may be disposed on the base 1400.

The sensor holder 1040 may have therein a groove 1041. The groove 1041 may be depressed from the outer lateral surface of the sensor holder 1040. The second coil 1600 may be disposed in the groove 1041. The groove 1041 may be spaced apart from the upper surface of the printed circuit board 1050.

The sensor holder 1040 may have therein a groove 1042. The groove 1042 may be depressed from the lower surface of the sensor holder 1040. The image sensor 1060 may be disposed in the space defined between the sensor holder 1040 and the printed circuit board 1050 due to the groove 1042. The groove 1042 in the sensor holder 1040 may include a first surface 1042a, which faces the lateral side surface of the image sensor 1060, and a second surface 1042b, which faces the upper surface of the image sensor 1060. A metal layer 1650 may be disposed on the lower surface of the sensor holder 1040, the first surface 1042a of the groove 1042 in the sensor holder 1040, and the second surface 1042b of the groove 1042 in the sensor holder 1040.

The sensor holder 1040 may have therein a recess 1043. The recess 1043 may be depressed from the lateral side surface of the sensor holder 1040 and from the groove 1041 in the sensor holder 1040 further than the groove 1041 in the sensor holder 1040. A terminal portion 1524 of a lower elastic member 1520 may be disposed in the recess 1043. A terminal member 1610 may be disposed in the recess 1043. A conductive member 1620 configured to connect the terminal portion 1524 and the terminal member 1610 to the printed circuit board 1050 may be disposed in the recess 1043.

The sensor holder 1040 may have therein a groove 1044. The groove 1044 may be formed in the upper surface of the sensor holder 1040. The groove 1044 may be depressed from the upper surface of the sensor holder 1040. The filter 1030 may be disposed in the groove 1044.

The camera module 1010A may include the printed circuit board (PCB) 1050. The printed circuit board 1050 may be a board or a circuit board. The lens moving apparatus 1010 may be disposed on the printed circuit board 1050. The sensor holder 1040 may be disposed between the printed circuit board 1050 and the lens moving apparatus 1010. The printed circuit board 1050 may be conductively connected to the lens moving apparatus 1010. The image sensor 1060 may be disposed on the printed circuit board 1050. The printed circuit board 1050 may be provided with various circuits, devices, controllers and the like, which are configured to convert an image formed on the image sensor 1060 into an electric signal and transmit the converted electric signal to an external device.

The camera module 1010A may include the image sensor 1060. Light that has passed through the lens and the filter 1030 may be incident on the image sensor 1060, thereby forming an image on the image sensor. The image sensor 1060 may be mounted on the printed circuit board 1050. The image sensor 1060 may be conductively connected to the printed circuit board 1050. For example, the image sensor 1060 may be coupled to the printed circuit board 1050 using Surface-Mounting Technology (SMT). Alternatively, the image sensor 1060 may be coupled to the printed circuit board 1050 using flip-chip technology. The image sensor 1060 may be disposed such that the lens coincides with the optical axis. In other words, the optical axis of the image sensor 1060 may be aligned with the optical axis of the lens. The image sensor 1060 may convert light, incident on the effective image region of the image sensor 1060, into an electric signal. The image sensor 1060 may be any one of a charge-coupled device (CCD), a metal oxide semiconductor (MOS), a CPD and a CID.

The camera module 1010A may include motion sensor. The motion sensor may be mounted on the printed circuit board 1050. The motion sensor may be conductively connected to the controller through the circuit pattern formed on the printed circuit board 1050. The motion sensor may output information about a rotational angular speed of motion of the camera module 1010A. The motion sensor may include a dual-axis or triple-axis gyro sensor or an angular speed sensor.

The camera module 1010A may include the controller. The controller may be disposed on the printed circuit board 1050. The controller may be conductively connected to the first coil 1220 of the lens moving apparatus 1010. The controller may individually control the direction, the intensity, the amplitude and the like of the current supplied to the first coil. The controller may be conductively connected to the second coil 1600. The controller may control the lens moving apparatus 1010 to perform an autofocus function. Furthermore, the controller may perform autofocus feedback control for the lens moving apparatus 1010.

The camera module 1010A may include a connector 1090. The connector 1090 may be conductively connected to the printed circuit board 1050. The connector 1090 may include a port, which is to be conductively connected to an external device.

The camera module 1010A may include the lens moving apparatus 1010.

The lens moving apparatus 1010 may be a voice coil motor (VCM). The lens moving apparatus 1010 may be a lens-driving motor. The lens moving apparatus 1010 may be a lens-driving motor. In the embodiment, the lens moving apparatus 1010 may include a closed-loop autofocus (CLAF) actuator or closed-loop autofocus (CLAF) module. For example, the assembly in which the lens moving apparatus 1010 is assembled with the lens, the image sensor and the printed circuit board may be considered to be the camera module.

The lens moving apparatus 1010 may include the cover 1100. The cover 1100 may cover the housing 1310. The cover 1100 may be coupled to the base 1400. The cover 1100 may define the internal space in conjunction with the base 1400. The cover 1100 may accommodate therein the housing 1310. The cover 1100 may accommodate therein the bobbin 1210. The cover 1100 may define the appearance of the camera module. The cover 1100 may be configured to have a hexahedral shape, which is open at the lower surface thereof. The cover 1100 may be a non-magnetic body. The cover 1100 may be made of a metal. The cover 1100 may be embodied as a metal plate. The cover 1100 may be connected to the ground portion of the printed circuit board. Accordingly, the cover 1100 may be grounded. The cover 1100 may block electromagnetic interference (EMI). Here, the cover 1100 may be referred to as a 'shield can' or an 'EMI shield can'.

The cover 1100 may include an upper plate 1100. The cover 1100 may include a side plate 1120. The side plate 1120 may extend from the upper plate 1110. The cover 1100 may include the upper plate 1110 and the side plate 1120 extending downwards from the outer periphery or the edge of the upper plate 1110. The lower end of the side plate 1120 of the cover 1100 may be disposed on a step 1460 of the base 1400. The inner surface of the side plate 1120 of the cover 1100 may be fixed to the base 1400 using an adhesive.

The cover 1100 may include a plurality of side plates. The cover 1100 may include the plurality of side plates and a plurality of corners defined between the plurality of side plates. The cover 1100 may include four side plates and four corners defined between the four side plates. The cover 1100 may include a first side plate, a second side plate disposed opposite the first side plate, and third and fourth side plates, which are disposed between the first side plate and the second side plate and opposite each other. The cover 1100 may include first to fourth corners. The cover 1100 may include a first corner, a second corner that is disposed opposite the first corner, and third and fourth corners, which are disposed opposite each other.

The cover 1100 may include an inner yoke 1130. The inner yoke 1130 may extend downwards from the inner periphery of the upper plate 1110. The inner yoke 1130 may be disposed inside the side plate 1120. At least a portion of the inner yoke 1130 may be disposed in a groove 1213 in the bobbin 1210. The inner yoke 1130 may serve to prevent rotation of the bobbin 1210. The inner yoke 1130 may include a plurality of inner yokes. The inner yoke 1130 may include four inner yokes. The four inner yokes may be respectively formed at the four corners of the cover 1100.

The lens moving apparatus 1010 may include a movable unit 1200. The movable unit 1200 may be coupled to the lens. The movable unit 1200 may be connected to a stationary unit 1300 via an elastic member 1500. The movable unit 1200 may be moved by the interaction with the stationary unit 1300. Here, the movable unit 1200 may be moved together with the lens. The movable unit 1200 may be moved during AF operation. Here, the movable unit 1200 may be referred to as an 'AF movable unit'.

The movable unit 1200 may include the bobbin 1210. The bobbin 1210 may be disposed in the housing 1310. The bobbin 1210 may be movably coupled to the housing 1310. The bobbin 1210 may be movable relative to the housing

1310 in the optical-axis direction. The bobbin 1210 may be disposed in the cover 1100. The bobbin 1210 may be disposed on the base 1400.

The bobbin 1210 may have a bore 1211 therein. The bore 1211 may be a through hole. The lens may be coupled to the bore 1211. A thread may be formed in the inner circumferential surface of the bore 1211. Alternatively, the inner circumferential surface of the bore 1211 in the bobbin 1210 may be formed so as to have a curved surface rather than being provided with the thread. The bobbin 1210 may include a first protrusion, which is coupled to an upper elastic member 1510. The first protrusion of the bobbin 1210 may be fitted into a corresponding hole in the upper elastic member 1510 and may be coupled thereto. The bobbin 1210 may include a second protrusion, which is coupled to the lower elastic member 1520. The second protrusion of the bobbin 1210 may be fitted into a corresponding hole in the lower elastic member 1520, and may be coupled thereto.

The bobbin 1210 may include a rib 1212. The rib 121 may project from the lateral side surface of the bobbin 1210. The rib 1212 may hold the first coil 1220. The rib 1212 may include an upper rib projecting from the upper portion of the bobbin 1210 and a lower rib projecting from the lower portion of the bobbin 1210. The first coil 1220 may be wound between the upper rib and the lower rib, and may be secured thereto.

The bobbin 1210 may have the groove 1213 therein. The groove 1213 may be an inner-yoke-receiving groove. At least a portion of the inner yoke 1130 of the cover 1100 may be disposed in the groove 1213. The groove 1213 may be depressed from the upper surface of the bobbin 1210. The width of the groove 1213 may be somewhat greater than the width of the inner yoke 1130. By virtue of the above-mentioned disposition, it is possible to prevent the bobbin 1210 from rotating because the bobbin 1210 catches on the inner yoke 1130 when the bobbin 1210 is caused to be rotated.

The bobbin 1210 may include an upper stopper 1214. The upper stopper 1214 may project from the upper surface of the bobbin 1210. The upper surface of the upper stopper 1214 may define the upper end of the bobbin 1210. Accordingly, when the bobbin 1210 is maximally moved upwards, the upper surface of the upper stopper 1214 may come into contact with the upper plate 1110 of the cover 1100. The upper stopper 1214 of the bobbin 1210 may overlap the upper plate 1110 of the cover 1100 in the optical-axis direction.

The bobbin 1210 may include a lower stopper. The lower stopper may project from the lower surface of the bobbin 1210. The lower surface of the lower stopper may define the lower end of the bobbin 1210. Accordingly, when the bobbin 1210 is maximally moved downwards, the lower surface of the lower stopper may come into contact with the base 1400. The lower stopper of the bobbin 1210 may overlap the base 1400 in the optical-axis direction.

The bobbin 1210 may be coupled to at least one of the elastic member 1500 and the first coil 1220 using an adhesive. Here, the adhesive may be epoxy, which is hardened by at least one of heat, a laser, and ultraviolet (UV) radiation.

The movable unit 1200 may include the first coil 1220. The first coil 1220 may be an 'AF moving coil'. The first coil 1220 may be disposed on the bobbin 1210. The first coil 1220 may be disposed in the state of being in contact with the bobbin 1210. The first coil 1220 may be disposed between the bobbin 1210 and the housing 1310. The first coil 1220 may be disposed on the outer periphery of the bobbin 1210. The first coil 1220 may be wound around the bobbin 1210. The coil 1220 may face the magnet 1320. The first coil 1220 may electromagnetically interact with the magnet 1320. When current flows in the first coil 1220 and thus an electromagnetic field is generated around the first coil 1220, the first coil 1220 may be moved relative to the magnet 1320 by virtue of the electromagnetic interaction between the first coil 1220 and the magnet 1320.

The lens moving apparatus 1010 may include the stationary unit 1300. The stationary unit 1300 may movably support the movable unit 120. The stationary unit 1300 may move the movable unit 1200 through the interaction with the movable unit 1200. The stationary unit 1300 may include the housing 1310 and the magnet 1320. Here, the base and the cover 1100 may also be considered to be the stationary unit 1300.

The stationary unit 1300 may include the housing 1310. The housing 1310 may be disposed outside the bobbin 1210. The housing 1310 may receive at least a portion of the bobbin 1210. The housing 1310 may be disposed inside the cover 1100. The housing 1310 may be disposed between the cover 1100 and the bobbin 1210. The housing 1310 may be made of a material different from that of the cover 1100. The housing 1310 may be made of an insulation material. The housing 1310 may be an injection-molded object. The magnet 1320 may be disposed on the housing 1310. The housing 1310 and the magnet 1320 may be coupled to each other using an adhesive. The upper elastic member 1520 may be coupled to the upper portion of the housing 1310. The lower elastic member 1520 may be coupled to the lower portion of the housing 1310. The housing 1310 may be coupled to the elastic member 1500 by means of heat fusion and/or an adhesive.

The housing 1310 may include first and second side portions, which are disposed opposite each other, third and fourth side portions, which are disposed opposite each other, a first corner portion connecting the first side portion to the third side portion, a second corner portion connecting the first side portion to the fourth side portion, a third corner portion connecting the second side portion to the fourth side portion, and a fourth corner portion connecting the second side portion to the third side portion.

The housing 1310 may have therein a first bore 1311. The first bore 1311 may be a through hole. The first bore 1311 may be formed through the center of the housing 1310 in the vertical direction. The bobbin 1210 may be disposed in the first bore 1311 in the housing 1310.

The housing 1310 may have a second hole 1312. The second hole 1312 may be a 'magnet-receiving hole'. The magnet 1320 may be disposed in the second hole 1312. The second hole 1312 may be formed through the side portion of the housing 1310 in a direction perpendicular to the optical axis. In a modification, the second hole 1312 may be a groove.

The housing 1310 may include a protrusion 1313. The protrusion 1313 may project from the upper surface of the housing 1310. The protrusion 1313 may be coupled to the upper elastic member 1500. The protrusion 1313 may be fitted into a corresponding hole in the upper elastic member 1500, and may be coupled thereto.

The housing 1310 may be coupled to at least one of the cover 1100, the base 1400, the elastic member 1500, and the magnet 1320 using an adhesive. Here, the adhesive may be epoxy, which is hardened by at least one of heat, a laser and ultraviolet (UV) radiation.

The stationary unit 1300 may include the magnet 1320. The magnet 1320 may be a 'drive magnet'. The magnet 1320 may be disposed on the housing 1310. The magnet 1320 may be disposed between the first coil 1220 and the side plate 1120 of the cover 1100. The magnet 1320 may be disposed between the bobbin 1210 and the housing 1310. The magnet 1320 may face the first coil 1220. The magnet 1320 may electromagnetically interact with the first coil 1220. The magnet 1320 may be used in AF operation. The magnet 1320 may be disposed on the side portion of the housing 1310. Here, the magnet 1320 may be formed as a flat magnet. The magnet 1320 may be made of a flat plate. The magnet 1320 may be configured to have the form of a rectangular parallelepiped.

The magnet 1320 may include a plurality of magnets. The magnet 1320 may include four magnets. The magnet 1320 may include first to fourth magnets 1321, 1322, 1333 and 1334. The first magnet 1321 may be disposed on the first side portion of the housing 1310. The second magnet 1322 may be disposed on the second side portion of the housing 1310. The third magnet 1323 may be disposed on the third side portion of the housing 1310. The fourth magnet 1324 may be disposed on the fourth side portion of the housing 1310.

The lens moving apparatus 1010 may include the base 1400. The base 1400 may be disposed under the housing 1310. The base 1400 may be disposed under the bobbin 1210. At least a portion of the base 1400 may be spaced apart from the bobbin 1210. The base 1400 may be coupled to the side plate 1120 of the cover 1100. The base 1400 may be disposed between the sensor holder 1040 and the sensor holder 1210. The base 1400 may be formed separately from the sensor holder 1040. In a modification, the base 1400 may be integrally formed with the sensor holder 1040.

The base 1400 may have therein a bore 1410. The bore 1410 may be a through hole. The bore 1410 may be formed through the base 1400 in the optical-axis direction. The light that has passed through the lens and the bore 1410 may be incident on the image sensor 1060.

The base 1400 may include a protrusion 1420. The protrusion 1420 may extend from the inner circumferential surface of the bore 1410 in the base 1400. The protrusion 1420 may project from the upper surface of the base 1400. The protrusion 1420 may be formed on the upper surface of the base 1400. The protrusion 1420 may be formed around the periphery of the bore 1410 in the base 1400.

The base 1400 may include a projection 1430. The projection 1430 may extend from the outer surface of the base 1400. The projection 1430 may project from the upper surface of the base 1400. The projection 1430 may be formed on the upper surface of the base 1400. The projection 1430 may be formed around the outer periphery of the base 1400.

The base 1400 may have a groove 1440 therein. The groove 1440 may be a terminal-receiving groove. The groove 1440 may be depressed from the lateral side surface of the base 1400. The terminal portion 1524 of the lower elastic member 1520 may be disposed in the groove 1440. The groove 1440 may be formed so as to correspond to at least a portion of the terminal portion 1524 of the lower elastic member 1520. The depth of the groove 1440 may be equal to or greater than the thickness of the terminal portion 1524 of the lower elastic member 1520.

The base 1400 may include a step 1350. The step 1450 may be formed on the lateral side surface of the base 1400. The step 1450 may be formed on the outer circumferential surface of the base 1400. The step 1450 may be formed by the lower portion of the lateral side surface of the base, which projects from the lateral side surface. The lower end of the side plate 1120 of the cover 1100 may be disposed on the step 1450.

The lens moving apparatus 1010 may include the elastic member 1500. The elastic member 1500 may connect the housing 1310 to the bobbin 1210. The elastic member 1500 may be coupled both to the housing 1310 and to the bobbin 1210. The elastic member 1500 may movably support the bobbin 1210. The elastic member 1500 may elastically support the bobbin 1210. At least a portion of the elastic member 1500 may be elastic. The elastic member 1500 may support movement of the bobbin 1210 during AF operation. Here, the elastic member 1500 may be an "AF support member".

The elastic member 1500 may include the upper elastic member 1510. The upper elastic member 1510 may be coupled both to the upper portion of the bobbin 1210 and to the upper portion of the housing 1310. The upper elastic member 1510 may be coupled to the upper surface of the bobbin 1210. The upper elastic member 1510 may be coupled to the upper surface of the housing 1310. The upper elastic member 1510 may be embodied as a leaf spring.

The upper elastic member 1510 may include an inner portion 1511. The inner portion 1511 may be coupled to the bobbin 1210. The inner portion 1511 may be coupled to the upper surface of the bobbin 1210. The inner portion 1511 may include a hole or a groove coupled to the protrusion of the bobbin 1210. The inner portion 1511 may be fixed to the bobbin 1210 using an adhesive.

The upper elastic member 1510 may include an outer portion 1512. The outer portion 1512 may be coupled to the housing 1310. The outer portion 1512 may be coupled to the upper surface of the housing 1310. The outer portion 1512 may have therein a hole or a groove, which is coupled to the protrusion 1313 of the housing 1310. The outer portion 1512 may be fixed to the housing 1310 using an adhesive.

The upper elastic member 1510 may include a connector 1513. The connector 1513 may connect the outer portion 1512 to the inner portion 1511. The connector 1513 may be elastic. Here, the connector 1513 may be referred to as an "elastic portion". The connector 1513 may include a portion, which is bent twice or more.

The elastic member 1500 may include the lower elastic member 1520. The lower elastic member 1520 may connect the bobbin 1210 to the base 1400. The lower elastic member 1520 may be coupled both to the lower portion of the bobbin 1210 and to the lower portion of the housing 1310. The lower elastic member 1520 may be coupled to the lower surface of the bobbin 1210. The lower elastic member 1520 may be coupled to the lower surface of the housing 1310. The lower elastic member 1520 may be embodied as a leaf spring. A portion of the lower elastic member 1520 may be fixed between the housing 1310 and the base 1400.

The lower elastic member 1520 may include a plurality of lower elastic members. The lower elastic member 1520 may include two lower elastic members. The lower elastic member 1520 may include first and second lower elastic members 1520-1 and 1520-2. The first and second lower elastic members 1520-1 and 1520-2 may be spaced apart from each other. The first and second lower elastic members 1520-1 and 1520-2 may be conductively connected to the first coil 1220. The first and second lower elastic members 1520-1 and 1520-2 may be used as conductive lines, through which current is applied to the first coil 1220.

The lower elastic member 1520 may include an inner portion 1521. The inner portion 1521 may be connected to the bobbin 1210. The inner portion 1521 may be coupled to the bobbin 1210. The inner portion 1521 may be coupled to the lower surface of the bobbin 1210. The inner portion 1521 may have therein a hole or a groove, which is coupled to the protrusion of the bobbin 1210. The inner portion 1521 may be fixed to the bobbin 1210 using an adhesive.

The lower elastic member 1520 may include the outer portion 1522. The outer portion 1522 may be connected to the base 1400. The outer portion 1522 may be coupled to the housing 1310. The outer portion 1522 may be coupled to the lower surface of the housing 1310. The outer portion 1522 may have therein a hole or a groove, which is coupled to the protrusion of the housing 1310. The outer portion 1522 may be fixed to the housing 1310 using an adhesive.

The lower elastic member 1520 may include a connector 1523. The connector 1523 may connect the outer portion 1522 to the inner portion 1521. The connector 1523 may be elastic. Here, the connector 1523 may be referred to as an "elastic portion". The connector 1523 may include a portion, which is bent twice or more.

The lower elastic member 1520 may include a terminal portion 1524. The terminal portion 1524 may extend from the outer portion 1522. The terminal portion 1524 may be connected to the outer portion 1522. The terminal portion 1524 may be integrally formed with the outer portion 1522, and may be bent at the outer portion 1522 and then extend downwards. In a modification, the terminal portion 1524 may be formed separately from the lower elastic member 1520. The terminal portion 1524 may include two terminals. The terminal portion 1524 may be coupled to the terminal of the printed circuit board 1050 via a conductive member 1620. Here, the conductive member 1620 may be a solder ball or conductive epoxy. The terminal portion 1524 may be disposed on the lateral side surface of the base 1400. The terminal portion 1524 may be disposed in the groove 1440 in the base 1400. Each of the two elastic members may include the terminal portion 1524. The terminal portion 1524 may be disposed in the recess 1043 in the sensor holder 1040. The terminal portion 1524 may be disposed between the second coil 1600 and the base 1400 in a direction perpendicular to the optical axis.

The lens moving apparatus 1010 may include the second coil 1600. The second coil 1600 may be a sensing coil.

For example, the second coil 1600 may correspond to the sensing coil 170 of the lens moving apparatus 100 according to the embodiment shown in FIG. 1, and the description thereof may be applied to the second coil 1600 with or without modification.

The second coil 1600 may be disposed on the sensor holder 1040. The second coil 1600 may be disposed on the outer circumferential surface of the sensor holder 1040. The second coil 1600 may be disposed in the groove 1041 in the sensor holder 1040. The second coil 1600 may be wound around the sensor holder 1040. The second coil 1600 may be wound around the outer periphery of the sensor holder 1040, and may be held thereto.

In this embodiment, since the second coil 1600 is disposed on the sensor holder 1040, which is an external component of the lens moving apparatus 1010 rather than an internal component of the lens moving apparatus 1010, it is possible to prevent an increase of the size of the lens moving apparatus 1010 due to disposition of the second coil 1600. Furthermore, since the second coil 1600 is wound around the outer periphery of the sensor holder 1040, the thickness of the sensor holder 1040 may not be increased. In other words, there may be no influence on the overall thickness of the camera module 1010A. Specifically, this embodiment is capable of providing a CLAF camera module having a minimized thickness in the optical-axis direction.

The second coil 1600 may be disposed under the lower end of the side plate 1120 of the cover 1100. The second coil 1600 may overlap the side plate 1120 of the cover 1100 and the magnet 1320 in the optical-axis direction. The second coil 1600 may overlap the sensor holder 1040 in a direction perpendicular to the optical axis. The second coil 1600 may not overlap the image sensor 1060 in a direction perpendicular to the optical axis. In a modification, the second coil 1600 may overlap the image sensor 1060 in a direction perpendicular to the optical axis. The second coil 1600 may not overlap the printed circuit board 1050 in a direction perpendicular to the optical axis. In a modification, the second coil 1600 may be disposed on the printed circuit board 1050. Here, the second coil 1600 may be formed on the upper surface of the printed circuit board 1050 so as to form a patterned coil. The second coil 1600 may not overlap the filter 1030 in a direction perpendicular to the optical axis. In a modification, the second coil 1600 may overlap the filter 1030 in a direction perpendicular to the optical axis.

The second coil 1600 may be spaced apart from the upper surface of the printed circuit board 1050. Here, the conductive member 1620, which is configured to connect the terminal portion 1524 of the lower elastic member 1520 to the printed circuit board 1050, may be disposed between the second coil 1600 and the printed circuit board 1050 in the optical-axis direction.

In this embodiment, a combined signal in which a drive signal for driving the lens module 1020 is combined with a high-frequency signal may be applied to the first coil 1220. For example, the drive signal may be a signal component for moving the movable unit 1200, and the high-frequency signal may be a signal component for sensing the position of the movable unit 1200. The high-frequency signal may be a signal having a frequency higher than the frequency of the drive signal. The high-frequency signal, which is combined with the drive signal, may have a frequency of about 100 kHz-5 MHz. An induction current or voltage may be generated at the second coil 1600 as a result of the interaction with the first coil 1220. Specifically, an induction current or voltage may be generated at the second coil 1600 by the high-frequency signal applied to the first coil 1220, and it is possible to sense the position of the movable unit 1200 by measuring the generated induction current or voltage.

In this embodiment, the second coil 1600 may be disposed outside the lens moving apparatus 1010. Consequently, it is possible to reduce the size of the lens moving apparatus 1010 compared to the case in which the second coil 1600 is disposed inside the lens moving apparatus 1010. In a comparative example in which the second coil 1600 is disposed on the base 1400, the thickness of the lens moving apparatus 1010 in the optical-axis direction may be increased by the thickness of the second coil 1600.

The lens moving apparatus 1010 may include the terminal member 1610. At least a portion of the terminal member 1610 may be disposed on the sensor holder 1040. One end of the terminal member 1610 may be connected to the printed circuit board 1050, and the other end of the terminal member 1610 may be connected to the second coil 1600. In other words, the terminal member 1610 may conductively connect the printed circuit board 1050 to the second coil 1600. At least a portion of the terminal member 1610 may be disposed in the recess 1043 in the sensor holder 1040.

The terminal member 1610 may include a first portion 1611, which is connected to the printed circuit board 1050 via the conductive member 1620, a second portion 1612, which is connected to the second coil 1600, and a third portion 1613, which connects the first portion 1611 to the second portion 1612 and is disposed on the sensor holder 1040. Here, the third portion 1613 may be disposed on the upper surface of the sensor holder 1040. The upper surface of the sensor holder 1040 may be provided therein with a groove corresponding to the third portion 1613. The terminal member 1610 may be integrally formed with the sensor holder 1040 through insert injection molding.

In a modification, the terminal member 1610 of the lens moving apparatus 1010 may be omitted, and the second coil 1600 may be directly connected to the terminal of the printed circuit board 1050 via the conductive member 1620.

The lens moving apparatus 1010 may include the metal layer 1650. The metal layer 1650 may be disposed on the sensor holder 1040 between the second coil 1600 and the image sensor 1060. The metal layer 1650 is capable of preventing noise of a conductive signal from being generated between the second coil 1600 and the image sensor 1060 due to the reduced distance therebetween. The metal layer 1650 may include silver paste coating.

Figure 26:
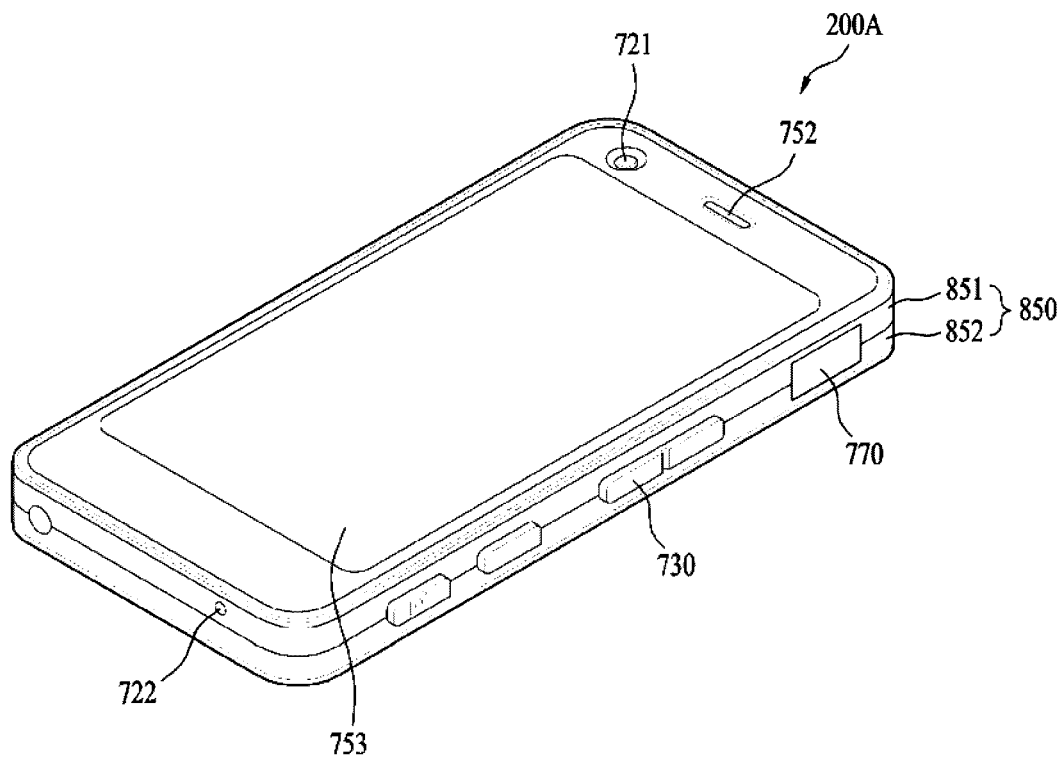
FIG. 26 is a perspective view of a portable terminal according to an embodiment.
Figure 27:
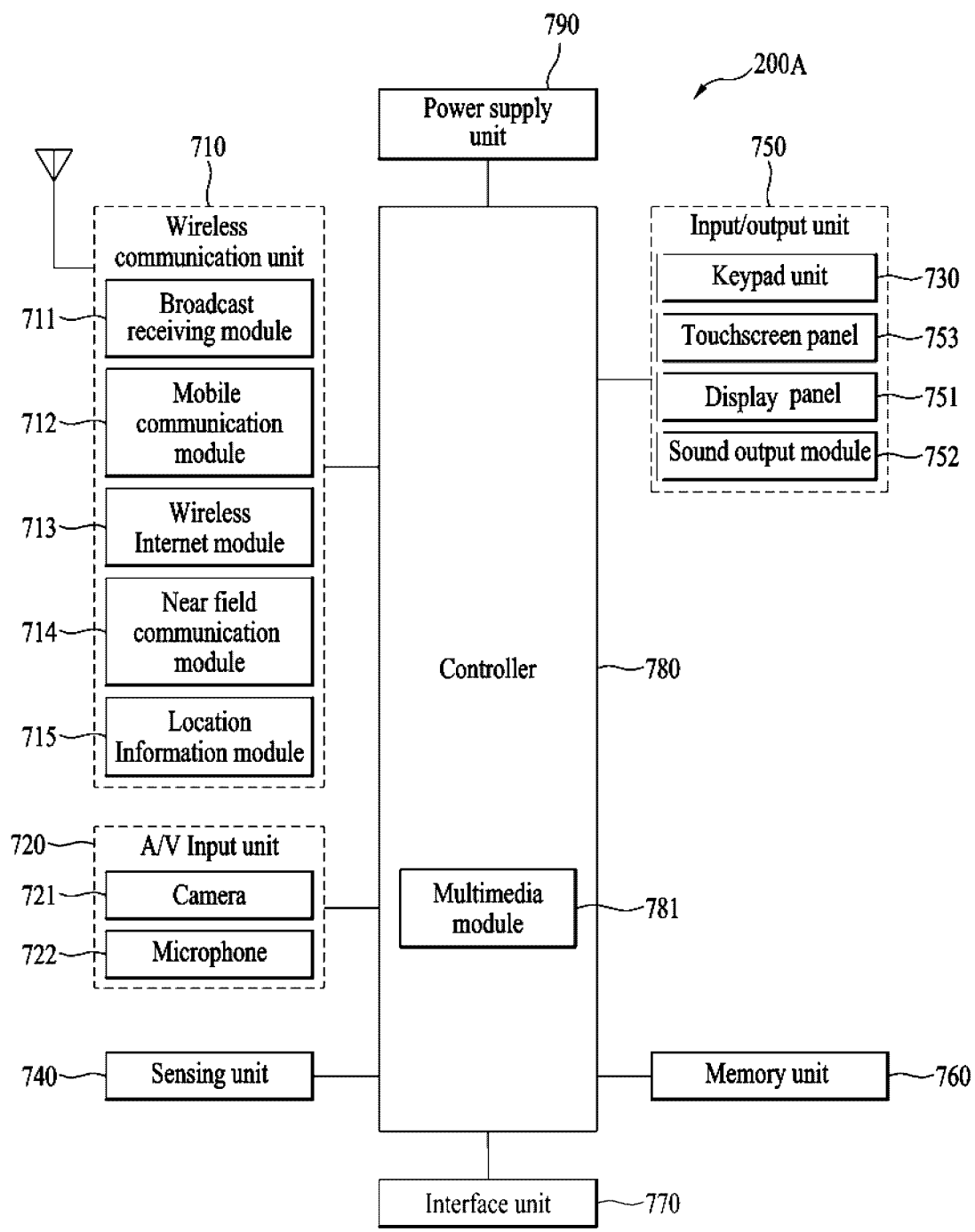
FIG. 27 is a view illustrating the configuration of the portable terminal illustrated in FIG. 26.

FIG. 25 is a perspective view illustrating a portable terminal 200A according to an embodiment. FIG. 26 is a view illustrating the configuration of the portable terminal 200A illustrated in FIG. 25.

Referring to FIGS. 25 and 26, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 25 has a bar shape, without being limited thereto, and may be any of various types, such as, for example, a slide type, a folder type, a swing type, or a swivel type, in which two or more sub-bodies are coupled so as to be movable relative to each other.

The body 850 may include a case (e.g. a casing, housing, or cover) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-reception module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may include the camera module 200 according to the embodiment.

The sensing unit 740 may sense the current state of the terminal 200A, such as, for example, opening or closing of the terminal 200A, the location of the terminal 200A, the presence of a user's touch, orientation of the terminal 200A, or acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device, and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input on a keypad. The touchscreen panel 753 may be disposed on one surface of the body 850.

The display module 751 may include a plurality of pixels, the color of which varies depending on the electrical signals applied thereto. For example, the display module 751 may include at least one among a liquid crystal display, a thin-film transistor liquid crystal display, an organic light-emitting diode, a flexible display, and a 3D display.

The sound output module 752 may output audio data received from the wireless communication unit 710 in, for example, a call-signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for processing and control by the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port, and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 180, or may be embodied separately from the controller 780.

The controller 780 may perform a pattern recognition process capable of recognizing writing input or drawing input performed on a touch screen as a character and an image, respectively.

The power supply unit 790 may supply power required to operate respective constituent elements upon receiving external power or internal power under the control of the controller 780.

The features, configurations, effects and the like described above in the embodiments are included in at least one embodiment, but the invention is not limited only to the embodiments. In addition, the features, configurations, effects and the like exemplified in the respective embodiments may be combined with other embodiments or modified by those skilled in the art. Accordingly, content related to these combinations and modifications should be construed as falling within the scope of the disclosure.

INDUSTRIAL APPLICABILITY

Embodiments may be applied to a lens moving apparatus, a camera device module, and an optical device, which are capable of facilitating an operation of bonding each of a sensing coil and a coil to an elastic member and of simplifying the bonding operation.

The invention claimed is:
1. A lens moving apparatus comprising:
a housing;
a bobbin disposed inside the housing;
a coil coupled to the bobbin;
a magnet disposed on the housing so as to face the coil;
a base disposed so as to be spaced apart from the bobbin;
a lower elastic member coupled to the bobbin and comprising a first elastic member, a second elastic member, a third elastic member, and a fourth elastic member, wherein the first to fourth elastic members are disposed on the base; and
a sensing coil disposed on the housing so as to generate an induction voltage resulting from interaction with the coil,
wherein a corner of the base and a corner of the housing form a coupling region in which the two corners are coupled to each other,
wherein the sensing coil comprises a portion disposed outside the coupling region, and
wherein the sensing coil comprises a portion that is in contact with an outer surface of the coupling region and overlaps the coupling region in a direction perpendicular to an optical axis.

2. The lens moving apparatus according to claim 1, wherein the coupling region comprises:
a column projecting from the corner of the base toward the housing; and
a groove formed in the corner of the housing and is coupled to the column.

3. The lens moving apparatus according to claim 1, wherein the coil is conductively connected to the first and second elastic members, and the sensing coil is conductively connected to the third and fourth elastic members.

4. The lens moving apparatus according to claim 1, wherein the coil has a ring shape surrounding an outer surface of the bobbin, and the sensing coil has a ring shape surrounding a lower portion of an outer surface of the housing.

5. The lens moving apparatus according to claim 1, wherein the sensing coil overlaps the magnet in an optical-axis direction but does not overlap the coil in the optical-axis direction.

6. The lens moving apparatus according to claim 1, wherein each of the first and second elastic members comprises an inner frame coupled to a lower portion of the bobbin, and
wherein the coil is coupled at one end thereof to the inner frame of the first elastic member and at a remaining end thereof to the inner frame of the second elastic member.

7. The lens moving apparatus according to claim 6, wherein each of the third and fourth elastic members comprises an outer frame coupled to a lower portion of the housing, and
wherein the sensing coil is coupled at one end thereof to the outer frame of the third elastic member and at a remaining end thereof to the outer frame of the fourth elastic member.

8. The lens moving apparatus according to claim 1, wherein each of the first to fourth elastic members comprises a terminal which is bent and extends toward a first outer surface of the base.

9. The lens moving apparatus according to claim 2, wherein the column of the base is disposed inside the sensing coil.

10. The lens moving apparatus according to claim 2, wherein the column of the base is disposed outside the sensing coil.

11. The lens moving apparatus according to claim 1, wherein the coupling region comprises a column projecting from the corner of the base toward the housing, and
wherein the column of the base is disposed inside the sensing coil.

12. The lens moving apparatus according to claim 11, wherein the portion of the sensing coil is in contact with an outer surface of the column of the base and overlaps the column of the base in a direction perpendicular to the optical axis.

13. The lens moving apparatus according to claim 1, wherein the sensing coil surrounds a lower portion of the outer surface of the housing.

14. The lens moving apparatus according to claim 8, wherein the sensing coil is positioned above the terminal of each of the first to fourth elastic members.

15. A lens moving apparatus comprising:
a housing;
a bobbin disposed inside the housing;
a coil coupled to the bobbin;
a magnet disposed on the housing so as to face the coil;
a base disposed so as to be spaced apart from the bobbin;
a lower elastic member coupled to the bobbin; and
a sensing coil disposed on the housing so as to generate an induction voltage resulting from interaction with the coil,
wherein the base comprises a column projecting from a corner thereof and toward the housing,
wherein the column of the base is disposed outside of the sensing coil, and
wherein the sensing coil comprises a portion that is in contact with an inner surface of the column.

16. A lens moving apparatus comprising:
a housing;
a bobbin disposed inside the housing;
a coil coupled to the bobbin;
a magnet disposed on the housing so as to face the coil;
a base disposed so as to be spaced apart from the bobbin;
a lower elastic member coupled to the bobbin and comprising a terminal which is bent and extending toward an outer surface of the base; and
a sensing coil disposed on the housing so as to generate an induction voltage resulting from interaction with the coil,
wherein the sensing coil comprises a portion disposed outside the terminal of the lower elastic member.

17. The lens moving apparatus according to claim 1, wherein each of the first to fourth elastic members comprises an inner frame coupled to a lower portion of the bobbin, an outer frame coupled to a lower portion of the housing, and a frame connector connecting the inner frame and the outer frame.

18. The lens moving apparatus according to claim 17, wherein the first elastic member comprises a first terminal bent from the outer frame thereof and extends toward a first outer surface of the base, wherein the second elastic member comprises a second terminal bent from the outer frame thereof and extends toward the first outer surface of the base, wherein the third elastic member comprises a third terminal bent from the outer frame thereof and extends toward the first outer surface of the base, and wherein the fourth elastic member comprises a fourth terminal bent from the outer frame thereof and extends toward the first outer surface of the base.

19. The lens moving apparatus according to claim 15, wherein the sensing coil overlaps the column of the base in a direction perpendicular to an optical axis.

20. A camera module comprising:

a lens;

the lens moving apparatus according to claim 1; and an image sensor.

\* \* \* \* \*